(12) United States Patent
Greiner et al.

(10) Patent No.: US 10,423,539 B2
(45) Date of Patent: *Sep. 24, 2019

(54) DYNAMIC ADDRESS TRANSLATION WITH ACCESS CONTROL IN AN EMULATOR ENVIRONMENT

(71) Applicant: International Business Machines Corporation, Armonk, NY (US)

(72) Inventors: Dan F. Greiner, San Jose, CA (US); Charles W. Gainey, Jr., Poughkeepsie, NY (US); Lisa C. Heller, Rhinebeck, NY (US); Damian L. Osisek, Vestal, NY (US); Erwin Pfeffer, Lam (DE); Timothy J. Slegel, Staatsburg, NY (US); Charles F. Webb, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/830,160

(22) Filed: Dec. 4, 2017

(65) Prior Publication Data

US 2018/0089103 A1  Mar. 29, 2018

Related U.S. Application Data

(63) Continuation of application No. 15/159,938, filed on May 20, 2016, now Pat. No. 9,934,159, which is a
(Continued)

(51) Int. Cl.
*G06F 12/00* (2006.01)
*G06F 12/1027* (2016.01)
(Continued)

(52) U.S. Cl.
CPC ...... *G06F 12/1027* (2013.01); *G06F 9/30047* (2013.01); *G06F 12/0215* (2013.01);
(Continued)

(58) Field of Classification Search
CPC ............. G06F 12/1027; G06F 12/1009; G06F 12/145; G06F 12/0215; G06F 12/1036;
(Continued)

(56) References Cited

U.S. PATENT DOCUMENTS 4,669,043 A   5/1987  Kaplinsky ........................ 711/3
4,972,338 A  11/1990  Crawford et al.
(Continued)

FOREIGN PATENT DOCUMENTS

GB   2414842 A   12/2005
GB   2414842 A   12/2005
(Continued)

OTHER PUBLICATIONS

IBM System/370 Extended Architecture Interpretive Execution, SA22-7095-1, 2nd Edition, Sep. 1985.
(Continued)

*Primary Examiner* — Mark A Giardino, Jr.
(74) *Attorney, Agent, or Firm* — Fleit Gibbons Gutman Bongini Bianco PL; Jon A. Gibbons

(57) ABSTRACT

What is provided is an enhanced dynamic address translation facility. In one embodiment, a virtual address to be translated and an initial origin address of a translation table of the hierarchy of translation tables are obtained. Based on the origin address, a segment table entry is obtained which contains a format control field and an access validity field. If the format control and access validity are enabled, the segment table entry further contains an access control and fetch protection fields, and a segment-frame absolute address. Store operations to the block of data are permitted
(Continued)

only if the access control field matches a program access key provided by either a Program Status Word or an operand of a program instruction being executed. Fetch operations from the desired block of data are permitted only if the program access key associated with the virtual address is equal to the segment access control field.

20 Claims, 21 Drawing Sheets

Related U.S. Application Data continuation of application No. 14/634,020, filed on Feb. 27, 2015, now Pat. No. 9,378,128, which is a continuation of application No. 14/144,664, filed on Dec. 31, 2013, now Pat. No. 9,021,225, which is a continuation of application No. 11/972,688, filed on Jan. 11, 2008, now Pat. No. 8,677,098.

(51) Int. Cl.

| | | |
|---|---|---|
| *G06F 12/1009* | (2016.01) | |
| *G06F 12/14* | (2006.01) | |
| *G06F 12/02* | (2006.01) | |
| *G06F 12/1036* | (2016.01) | |
| *G06F 9/30* | (2018.01) | |
| *G06F 13/00* | (2006.01) | |
| *G06F 13/28* | (2006.01) | |

(52) U.S. Cl.
CPC ...... *G06F 12/1009* (2013.01); *G06F 12/1036* (2013.01); *G06F 12/145* (2013.01); *G06F 2212/1052* (2013.01); *G06F 2212/654* (2013.01); *G06F 2212/656* (2013.01); *G06F 2212/68* (2013.01)

(58) Field of Classification Search
CPC ......... G06F 9/30047; G06F 2212/1052; G06F 2212/654; G06F 2212/656; G06F 2212/68
See application file for complete search history.

(56) References Cited

U.S. PATENT DOCUMENTS

| | | | |
|---|---|---|---|
| 4,992,936 A | 2/1991 | Katada et al. | |
| 5,008,811 A | 4/1991 | Scalzi et al. ............... | 711/207 |
| 5,058,003 A | 10/1991 | White | |
| 5,551,013 A | 8/1996 | Beausoleil et al. | |
| 5,574,873 A | 11/1996 | Davidian | |
| 5,617,554 A | 4/1997 | Alpert et al. | |
| 5,790,825 A | 8/1998 | Traut | |
| 5,845,331 A | 12/1998 | Carter et al. | |
| 6,009,261 A | 12/1999 | Scalzi et al. | |
| RE37,305 E | 7/2001 | Chang et al. ............... | 711/207 |
| 6,308,255 B1 | 10/2001 | Gorshek, IV et al. | |
| 6,418,522 B1 | 7/2002 | Gaertner et al. | |
| 6,463,582 B1 | 10/2002 | Lethin et al. | |
| 6,574,706 B2 | 6/2003 | Sutherland et al. | |
| 6,879,989 B2 | 4/2005 | Cheng et al. | |
| 7,120,746 B2 | 10/2006 | Campbell et al. | |
| 7,197,601 B2 | 3/2007 | Slegel et al. | |
| 7,234,037 B2 | 6/2007 | Errickson et al. | |
| 2002/0129085 A1 | 9/2002 | Kubala et al. | |
| 2003/0056082 A1 | 3/2003 | Maxfield | |
| 2004/0024953 A1 | 2/2004 | Babaian et al. | |
| 2004/0098719 A1 | 5/2004 | Smith et al. | |
| 2004/0230758 A1 | 11/2004 | Slegel et al. | |
| 2004/0230768 A1 | 11/2004 | Slegel et al. | |
| 2004/0230976 A1 | 11/2004 | Slegel et al. | |
| 2005/0154855 A1 | 7/2005 | Harris et al. ............... | 711/206 |
| 2005/0268071 A1 | 12/2005 | Blandy et al. | |
| 2005/0289246 A1 | 12/2005 | Easton et al. | |
| 2006/0036824 A1 | 2/2006 | Greiner et al. | |
| 2007/0016904 A1 | 1/2007 | Adlung et al. | |
| 2007/0028072 A1 | 2/2007 | Hennessy et al. | |
| 2007/0124557 A1 | 5/2007 | Kanai | |
| 2009/0182964 A1 | 7/2009 | Greiner et al. | |
| 2009/0182966 A1 | 7/2009 | Greiner et al. | |
| 2009/0182971 A1 | 7/2009 | Greiner et al. | |
| 2009/0182972 A1 | 7/2009 | Greiner et al. | |
| 2009/0182973 A1 | 7/2009 | Greiner et al. | |
| 2009/0182974 A1 | 7/2009 | Greiner et al. | |
| 2009/0182975 A1 | 7/2009 | Greiner et al. | |
| 2009/0187724 A1 | 7/2009 | Greiner et al. | |
| 2009/0187728 A1 | 7/2009 | Greiner et al. | |
| 2009/0187732 A1 | 7/2009 | Greiner et al. | |
| 2009/0193214 A1 | 7/2009 | Greiner et al. | |
| 2009/0216992 A1 | 8/2009 | Greiner et al. | |

FOREIGN PATENT DOCUMENTS

| | | |
|---|---|---|
| JP | S62208147 | 9/1987 |
| JP | H1091597 | 4/1998 |
| JP | 2004326771 | 11/2004 |

OTHER PUBLICATIONS

IBM System/370 Extended Architecture, Principles of Operation, Publication No. SA22-7085-1, Second Edition, Jan. 1987, 584 pages.
IBM, Power ISA, Version 2.03, Sep. 29, 2006, 850 pages.
The SPARC Architecture Manual, Version 9, 1994 SPARC International Inc., San Jose, CA., SAV09R1459912, ISBN: 0-13-825001-4, 399 pages.
Intel 64 and IA-32 Architectures Software Developer's Manual, vol. 3A: System Programming Guide, Part 1, 253668-036US, Sep. 2010, 842 pages, http://www.intel.com/Assets/PDF/manual/253668.pdf (hardcopy of manual submitted with U.S. Appl. No. 11/972,718).
Office Action, dated Aug. 18, 2010, U.S. Appl. No. 11/972,697, Greiner et al., filed Jan. 11, 2008.
Notice of Allowance, dated Feb. 7, 2011, U.S. Appl. No. 11/972,715, Greiner et al., filed Jan. 11, 2008.
Office Action, dated Jan. 5, 2011, U.S. Appl. No. 11/972,682, Greiner et al., filed Jan. 11, 2008.
Office Action, dated Sep. 1, 2010, U.S. Appl. No. 11/972,715, Greiner et al., filed Jan. 11, 2008.
Office Action, dated Sep. 2, 2010, U.S. Appl. No. 11/972,706, Greiner et al., filed Jan. 11, 2008.
U.S. Appl. No. 11/972,682, Non-Final Office Action dated Jun. 18, 2010.
Non-Final Office Action dated Aug. 12, 2010, U.S. Appl. No. 11/972,694.
IBM, z/Architecture Principles of Operation, Apr. 2007, Sixth Edition, 1218 pges.
RW Marc and CE Schmaiz and RJ Shomler, Programmed Storage Utilization Measurement Technique, IBM Technical Disclosure Bulliten, Jun. 1973, Poughkeepsie NY.
JP Larner and RA Lassettre and ER Moore and BB Strickland, Channel DAT and Page Pinning for Block Unit Transfers, IBM Technical Disclosure Bulliten, Jul. 1980, Poughkeepsie NY.
JT Breslau and FC Greenstein and PG Rodell, Storage Key Protection At Object Level, IBM Technical Disclosure Bullten, Dec. 1995, Cary NC.
IBM Corporation, "z/Architecture Principles of Operation", XP002520423, Apr. 2007.
International Search Report and Written Opinion for PCT/EP2009/050050 dated Apr. 2, 2009.
International Search Report and Written Opinion for PCT/EP2009/050049 dated Apr. 7, 2009.
International Search Report and Written Opinion for PCT/EP2009/050048 dated Apr. 9, 2009.
International Search Report and Written Opinion for PCT/EP2009/050227 dated Apr. 15, 2009.
International Search Report and Written Opinion for PCT/EP2009/050051 dated Apr. 22, 2009.

(56) References Cited

OTHER PUBLICATIONS

International Search Report and Written Opinion for PCT/EP2009/050052 dated Apr. 23, 2009.
International Search Report and Written Opinion for PCT/EP2009/051864 dated May 27, 2009.
International Search Report and Written Opinion dated Apr. 2, 2009 for PCT/EP2009/050050.
"Z-Architecture Principles of Operation, Chapter 3," [on line], No. SA22-7832-06; Feb. 2008, XP002522211.
Intel 64 and IA-32 Architectures Software Developers Manual, vol. 3A: System Programming Guide, Part 1, 253668-036US, Sep. 2010, 832 pages.
Office Action, dated Aug. 12, 2010, U.S. Appl. No. 11/972,694, Greiner et al., filed Jan. 11, 2008.
Office Action, dated Jun. 23, 2010, U.S. Appl. No. 11/972,688, Greiner et al., filed Jan. 11, 2008.
U.S. Appl. No. 11/972,688, Non-Final Office Action dated Jun. 23, 2010.
U.S. Appl. No. 11/972,688 to Greiner et al, filed Jan. 11, 2008 "Dynamic Address Translation with Fetch Protection", Non-Final Office Action dated Jun. 23, 2010.
U.S. Appl. No. 11/972,682 to Greiner et al., filed Jan. 11, 2008, "Dynamic Address Translation with Access Control", Non-Final Office Action dated Jun. 18, 2010.

Format of Control Register 1

Format of Prefix Register

Format of the Virtual Address

Format of RX of the Virtual Address

Region-First-Table Entry (TT=11)

| Region-Second-Table Origin | | | | | | |
|---|---|---|---|---|---|---|
| 0 | | | | | | 31 |

| Region-Second-Table Origin (continued) | | P | TF | I | TT | TL |
|---|---|---|---|---|---|---|
| 32 | 52 | 54 | 56 | 58 59 | 60 | 62 63 |

FIG. 24

Region-Second-Table Entry (TT=10)

| Region-Third-Table Origin | | | | | | |
|---|---|---|---|---|---|---|
| 0 | | | | | | 31 |

| Region-Third-Table Origin (continued) | | P | TF | I | TT | TL |
|---|---|---|---|---|---|---|
| 32 | 52 | 54 | 56 | 58 59 | 60 | 62 63 |

FIG. 25

Region-Third-Table Entry (TT=01)

| Segment-Table Origin | | | | | | |
|---|---|---|---|---|---|---|
| 0 | | | | | | 31 |

| Segment-Table Origin (continued) | | P | TF | I | TT | TL |
|---|---|---|---|---|---|---|
| 32 | 52 | 54 | 56 | 58 59 | 60 | 62 63 |

FIG. 26

Segment-Table Entry (T-00, FC-0)
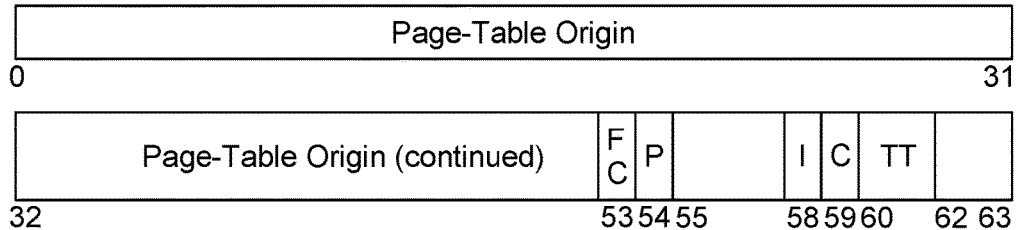
FIG. 27
Segment-Table Entry (T-00, FC-1)
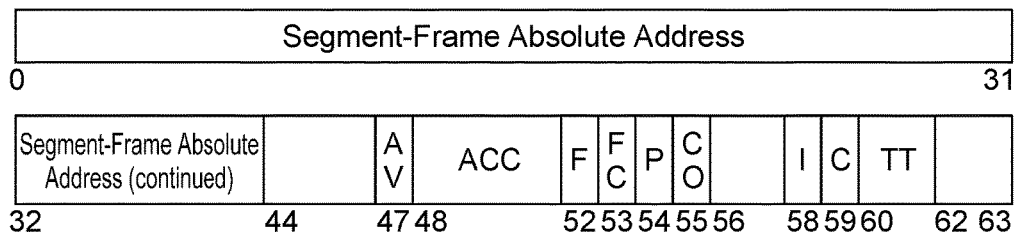
FIG. 28
```
Bits 60
and 61    Table Level
  11      Region-first
  10      Region-second
  01      Region-third
  00      Segment
```
FIG. 29
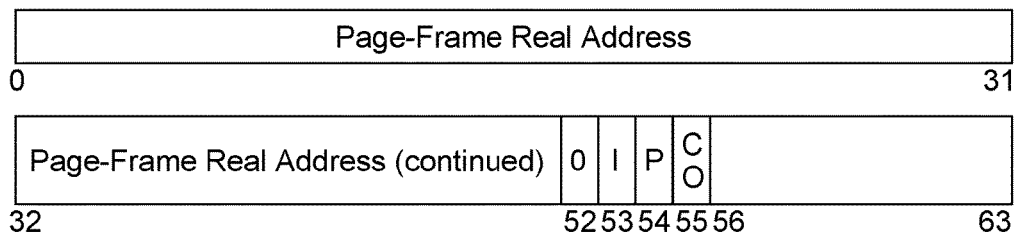
FIG. 30

DYNAMIC ADDRESS TRANSLATION WITH ACCESS CONTROL IN AN EMULATOR ENVIRONMENT

CROSS-REFERENCE TO RELATED APPLICATIONS

This application is continuation of and claims priority from U.S. patent application Ser. No. 15/159,938 filed on May 20, 2016, which claims priority from U.S. patent application Ser. No. 14/634,020 filed on Feb. 27, 2015, now U.S. Pat. No. 9,378,128, which claims priority from U.S. patent application Ser. No. 14/144,664 filed on Dec. 31, 2013, now U.S. Pat. No. 9,021,225, which is a continuation of and claims priority from U.S. patent application Ser. No. 11/972,688 filed on Jan. 11, 2008, now U.S. Pat. No. 8,677,098, the entire disclosure of each of the above referenced applications is herein incorporated by reference in their entirety.

FIELD OF THE INVENTION

The present invention relates generally to systems and methods for translating a virtual address in a computer system and, more particularly, to systems and methods of translating a virtual address into a real or absolute address of a block of data in a computer system having a dynamic address translation facility wherein virtual address translation occurs via a hierarchy of translation tables.

BACKGROUND OF THE INVENTION

Dynamic Address Translation provides the ability to interrupt the execution of a program at an arbitrary moment, record it and its data in auxiliary storage, such as a direct access storage device, and at a later time return the program and the data to different main storage locations for resumption of execution. The transfer of the program and its data between main and auxiliary storage may be performed piecemeal, and the return of the information to main storage may take place in response to an attempt by the CPU to access it at the time it is needed for execution. These functions may be performed without change or inspection of the program and its data, do not require any explicit programming convention in the relocated program, and do not disturb the execution of the program except for the time delay involved.

With appropriate support by an operating system, the dynamic address translation facility may be used to provide to a user a system wherein storage appears to be larger than the main storage which is available in the configuration. This apparent main storage is often referred to as virtual storage, and the addresses used to designate locations in the virtual storage are often referred to as virtual addresses. The virtual storage of a user may far exceed the size of the main storage which is available in the configuration and normally is maintained in auxiliary storage. The virtual storage is considered to be composed of blocks of data, commonly called pages (also referred to as segments and regions). Only the most recently referred to pages of the virtual storage are assigned to occupy blocks of physical main storage. As the user refers to pages of virtual storage that do not appear in main storage, they are brought in to replace pages in main storage that are less likely to be needed. In some cases, virtual storage is assigned to main storage for a long period of time (or permanently), regardless of whether the storage is referenced. The swapping of pages of storage may be performed by the operating system without the user's knowledge.

Programs use addresses (or virtual addresses) to access virtual storage. The program may fetch instructions from virtual storage or load data or store data from virtual storage using virtual addresses. The virtual addresses associated with a range of virtual storage define an address space. With appropriate support by an operating system, the dynamic address translation facility may be used to provide a number of address spaces. These address spaces may be used to provide degrees of isolation between users. Such support can consist of completely different address space for each user, thus providing complete isolation, or a shared area may be provided by mapping a portion of each address space to a single common storage area. Also, instructions are provided which permit a semi-privileged program to access more than one such address space.

Dynamic address translation provides for the translation of virtual addresses from multiple different address spaces. These address spaces are called primary address space, secondary address space, and Access Register specified address spaces. A privileged program can also cause the home address space to be accessed. Dynamic address translation may be specified for instruction and data addresses generated by the CPU.

What is needed is an enhanced dynamic address translation facility which provides additional functionality, capability, and protections heretofore unknown to this art.

SUMMARY OF THE INVENTION

What is provided are a system, method, and computer program product for an enhanced dynamic address translation facility which translates a virtual address into a real or absolute address of a desired block of data in main storage of a computer system having a machine architecture with a hierarchy of translation tables used for translation. Real addresses may be subject to prefixing to form an absolute address.

In one example embodiment, a virtual address to be translated and an initial origin address of a translation table of the hierarchy of translation tables are obtained. The translation table consists of a region first table, a region second table, a region third table, or a segment table. Based on the obtained initial origin address, a segment table entry is obtained from the segment table. The segment table entry is configured to contain a format control field. If an enhanced DAT facility and the format control field are enabled, determining whether an access validity field in the segment table entry is enabled. If the access validity field is enabled, the segment table entry further contains an access control field, a protection field, and a segment-frame absolute address of a large block of data in main storage. The large block of data is a block of at least 1 Megabyte in size. If the access control field is enabled, store operations to the desired block of data are permitted only if the access control field matches a program access key provided by either a Program Status Word or an operand of a program instruction being executed. Fetch operations from the desired block of data are permitted only if the program access key associated with the virtual address is equal to the access control field.

In yet another embodiment, if the access validity field is enabled, a protection exception is indicated in response to a fetch operation or a store operation being attempted at the desired block of memory and the segment access control field not matching the program access control field.

The invention will next be described in connection with certain illustrated embodiments. It should be understood that various changes and modifications can be made by those skilled in the art without departing from the spirit or scope of the invention.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 24, FIG. 25, and FIG. 26 are diagrams of a format of region table entries;

FIG. 27 is a diagram of a format I of segment table entry;

FIG. 28 is a diagram of a format II of segment table entry;

FIG. 29 is a diagram of the table type bits;

FIG. 30 is a diagram of a format of a page table entry;

DETAILED DESCRIPTION

It should be understood that statements made in the specification of the present application do not necessarily limit any of the various claimed inventions. Moreover, some statements may apply to some inventive features but not to others. Unless otherwise indicated, singular elements may be in the plural and vice versa with no loss of generality.

One of ordinary skill in this art would be readily familiar with addressing storage in a computing environment and using bits in a register or address field to indicate differing states and acting on those states. Further, one of average skill in this art would be knowledgeable in the art of computer program and knowledgeable about the workings and inter-relationships between components of computer systems.

Overview

What is provided is an example embodiment of an enhanced Dynamic Address Translation (DAT) facility. When the enhanced DAT facility is installed and enabled, DAT translation may produce either a page frame real address or a segment frame absolute address, determined by the Segment Table Entry (STE) format control in the segment table entry. As used herein, the term "enhanced DAT applies" means all of the following are true: 1) The EDAT facility is installed; 2) The EDAT facility is enabled via control register 0 (CR0) bit 40; and, 3) The address is translated by means of DAT-table entries.

When enhanced DAT applies, the following additional function is available in the DAT process:

A DAT protection bit is added to region table entries, providing function similar to the DAT protection bits in the segment and page table entries.

A STE format control is added to the segment table entry. When the STE format control is zero, DAT proceeds as is currently defined, except that a change recording override in the page table entry indicates whether setting of the change bit may be bypassed for the page.

When the STE format control is one, the segment table entry also contains the following:

A segment frame absolute address (rather than a page table origin) specifying the absolute storage location of the 1 Megabyte block.

Access control bits and a fetch protection bit which optionally may be used in lieu of the corresponding bits in the segment's individual storage keys.

A bit which determines the validity of the access control bits and a fetch protection bit in the segment table entry.

A change recording override which indicates whether setting of the change bit may be bypassed in the segment's individual storage keys.

Host Computer System

Figure 1:
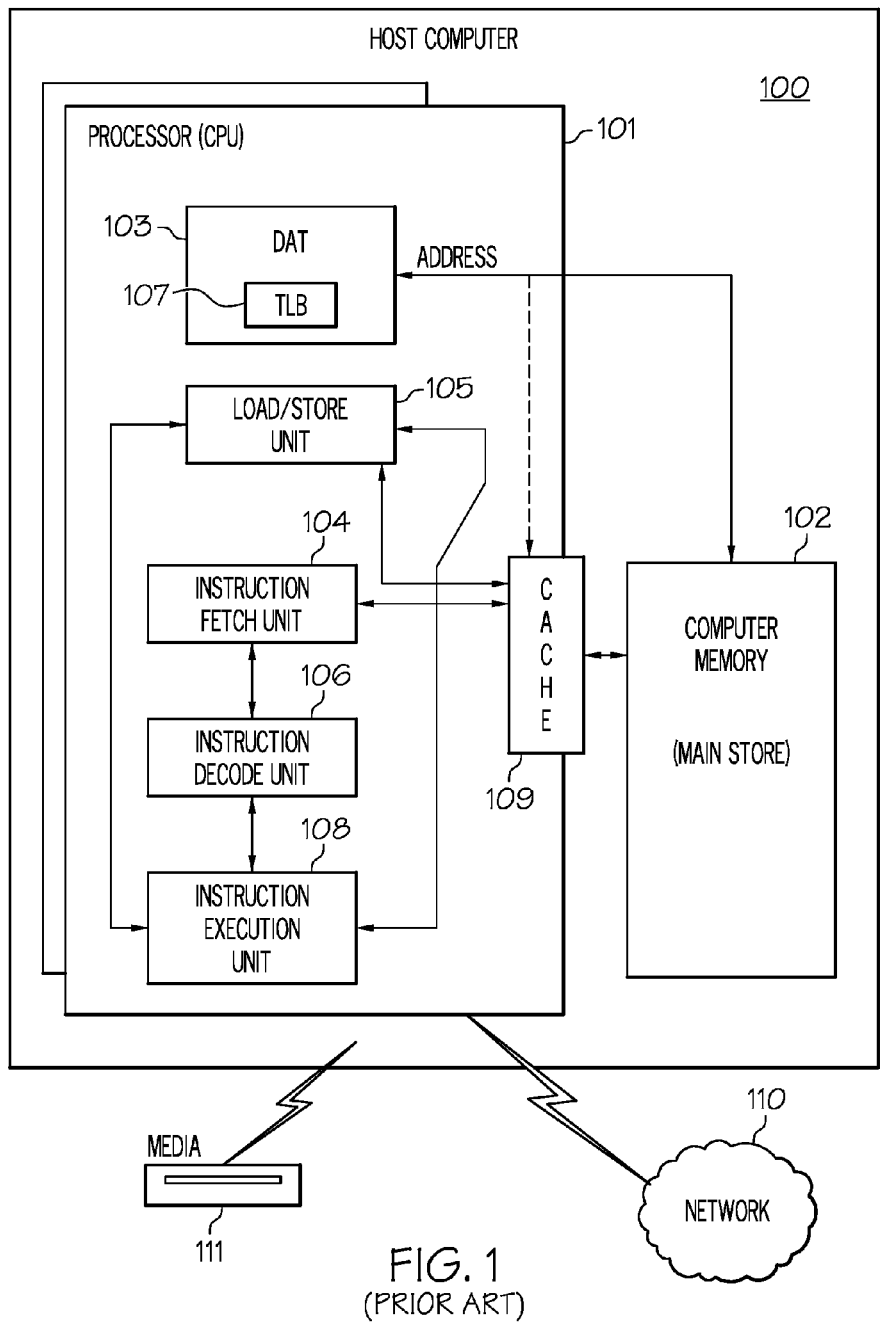
FIG. 1 illustrates one embodiment of a host computer system wherein enhanced dynamic address translation will be performed.

Referring to FIG. 1, representative components of a host computer system 100 are portrayed. Other arrangements of components may also be employed in a computer system which is well known in the art.

The host computing environment is preferably based on the z/Architecture® offered by International Business Machines Corporation (IBM®), Armonk, N.Y. The z/Architecture® is more fully described in: *z/Architecture® Principles of Operation*, IBM® Pub. No. SA22-7832-05, 6$^{th}$ Edition, (April 2007), which is incorporated by reference herein in its entirety. Computing environments based on the z/Architecture® include, for example, eServer and zSeries®, both by IBM®.

The representative host computer 100 comprises one or more CPUs 101 in communication with main store (computer memory 102) as well as I/O interfaces to storage devices 111 and networks 110 for communicating with other computers or storage area networks (SANs) and the like. The CPU may have Dynamic Address Translation (DAT) facility (function or unit) 103 for transforming program addresses (virtual addresses) into real address of memory. A DAT facility typically includes a translation lookaside buffer 107 for caching translations so that later accesses to the block of computer memory 102 do not require the delay of address translation. Typically a cache 109 is employed between computer memory 102 and the Processor 101. The cache 109 may be hierarchical having a large cache available to more than one CPU and smaller, faster (lower level) caches between the large cache and each CPU. In some implementations the lower level caches are split to provide separate low level caches for instruction fetching and data accesses. In an embodiment, an instruction is fetched from memory 102 by an instruction fetch unit 104 via a cache 109. The instruction is decoded in an instruction decode unit (106) and dispatched (with other instructions in some embodiments) to instruction execution units 108. Typically several execution units 108 are employed, for example an arithmetic execution unit, a floating point execution unit and a branch instruction execution unit. The instruction is executed by the execution unit, accessing operands from instruction specified registers or memory as needed. If an operand is to be accessed (loaded or stored) from memory 102, a load store unit 105 typically handles the access under control of the instruction being executed.

In an embodiment, the invention may be practiced by software (sometimes referred to Licensed Internal Code (LIC), firmware, micro-code, milli-code, pico-code and the like, any of which would be consistent with the present invention). Software program code which embodies the present invention is typically accessed by the processor also known as a CPU (Central Processing Unit) 101 of computer system 100 from long term storage media 111, such as a CD-ROM drive, tape drive or hard drive. The software program code may be embodied on any of a variety of known media for use with a data processing system, such as a diskette, hard drive, or CD-ROM. The code may be distributed on such media, or may be distributed to users from the computer memory 102 or storage of one computer system over a network 110 to other computer systems for use by users of such other systems.

Alternatively, the program code may be embodied in the memory 102, and accessed by the processor 101 using the processor bus. Such program code includes an operating system which controls the function and interaction of the various computer components and one or more application programs. Program code is normally paged from dense storage media 111 to high speed memory 102 where it is available for processing by the processor 101. The techniques and methods for embodying software program code in memory, on physical media, and/or distributing software code via networks are well known and will not be further discussed herein. Program code, when created and stored on a tangible medium (including but not limited to electronic memory modules (RAM), flash memory, compact discs (CDs), DVDs, magnetic tape and the like is often referred to as a "computer program product". The computer program product medium is typically readable by a processing circuit preferably in a computer system for execution by the processing circuit.

Figure 2:
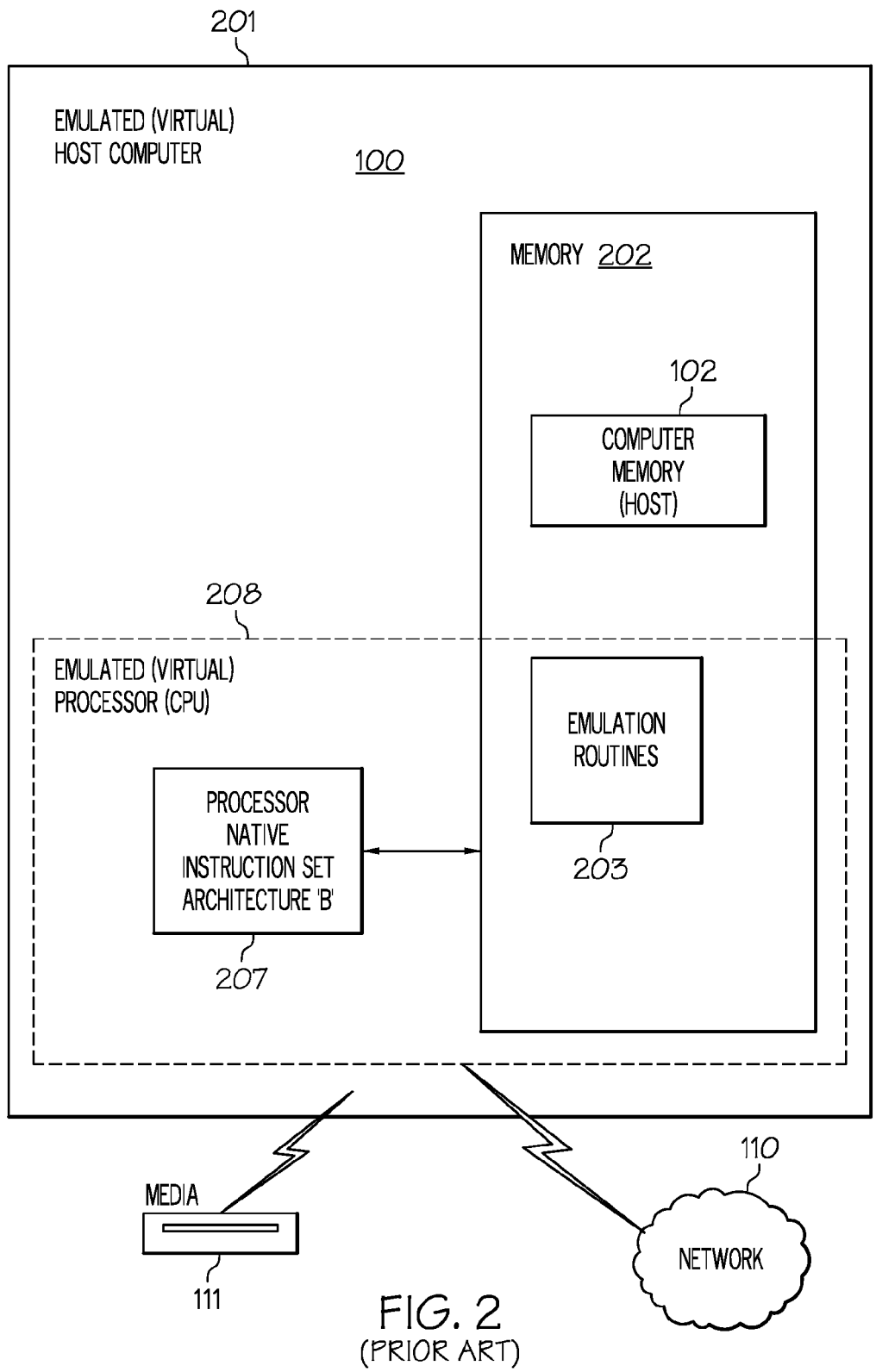
FIG. 2 provides an example emulated host computer system that emulates the host computer system of a host architecture.

In FIG. 2, an example emulated host computer system 201 is provided that emulates a host computer system 100 of a host architecture. In the emulated host computer system 201, the host processor (CPUs) 208 is an emulated host processor (or virtual host processor) and comprises an emulation processor 207 having a different native instruction set architecture than that used by the processor 101 of the host computer 100. The emulated host computer system 201 has memory 202 accessible to the emulation processor 207. In the example embodiment, the memory 207 is partitioned into a host computer memory 102 portion and an emulation routines 203 portion (routines which provide the emulation may be part of the host memory). The host computer memory 102 is available to programs of the emulated host computer 201 according to host computer architecture. The emulation processor 207 executes native instructions of an architected instruction set of an architecture other than that of the emulated processor 208, the native instructions obtained from emulation routines memory 203, and may access a host instruction for execution from a program in host computer memory 102 by employing one or more instruction(s) obtained in a Sequence & Access/Decode routine which may decode the host instruction(s) accessed to determine a native instruction execution routine for emulating the function of the host instruction accessed.

Other facilities that are defined for the host computer system 100 architecture may be emulated by Architected Facilities Routines, including such facilities as General Purpose Registers, Control Registers, Dynamic Address Translation, and I/O Subsystem support and processor cache for example. The emulation routines may also take advantage of function available in the emulation processor 207 (such as General Registers and dynamic translation of virtual addresses) to improve performance of the emulation routines. Special hardware and Off Load Engines may also be provided to assist the processor 207 in emulating the function of the host computer 100.

Computer Processor and Registers

In an embodiment, a CPU's program instruction functionality communicates with a plurality of registers over a communication bus. The communication bus may be internal or external to the CPU. Some registers may be read only. Other hardware and/or software may also read/write to one or more of the registers accessible by the CPU. An instruction operation code (opcode) determines which type of register is to be used in any particular machine instruction operation.

General Registers

Instructions may designate information in one or more of 16 general registers. The general registers may be used as base address registers and index registers in address arithmetic and as accumulators in general arithmetic and logical operations. Each register contains 64 bit positions. The general registers are identified by the numbers 0-15 and are designated by a four bit R field in an instruction. Some instructions provide for addressing multiple general registers by having several R fields. For some instructions, the use of a specific general register is implied rather than explicitly designated by an R field of the instruction.

For some operations, either bits 32-63 or bits 0-63 of two adjacent general registers are coupled, providing a 64-bit or 128-bit format, respectively. In these operations, the program must designate an even numbered register, which contains the leftmost (high order) 32 or 64 bits. The next higher numbered register contains the rightmost (low order) 32 or 64 bits. In addition to their use as accumulators in general arithmetic and logical operations, 15 of the 16 general registers are also used as base address and index registers in address generation. In these cases, the registers are designated by a four bit B field or X field in an instruction. A value of zero in the B or X field specifies that no base or index is to be applied, and, thus, general register 0 cannot be designated as containing a base address or index.

Control Registers

The control registers provide for maintaining and manipulating control information outside the program status word. The CPU has 16 control registers, each having 64 bit positions. The bit positions in the registers are assigned to particular facilities in the system, such as program event recording, and are used either to specify that an operation can take place or to furnish special information required by the facility. The control registers are identified by the numbers 0-15 and are designated by four bit R fields in the instructions LOAD CONTROL and STORE CONTROL. Multiple control registers can be addressed by these instructions.

Control Register 1

Figure 14:
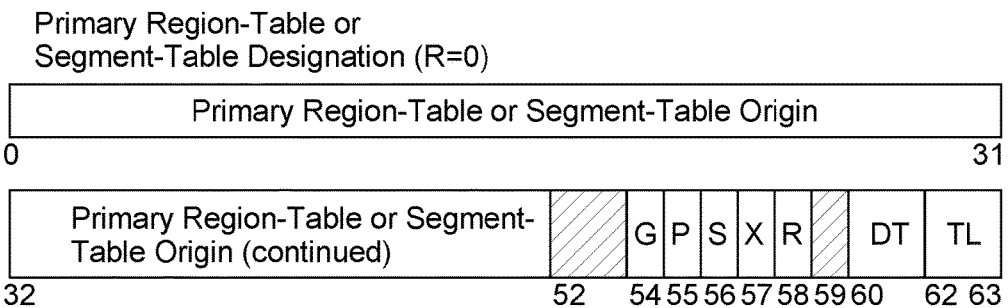
FIG. 14 and FIG. 15 are diagrams of a format of control register 1.
Figure 15:
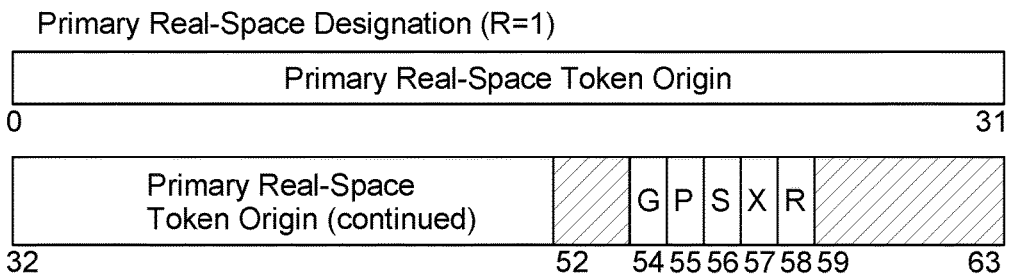

Control register 1 contains the Primary Address Space Control Element (PASCE). In one embodiment, control register 1 has one of the following two formats, depending on the real space control bit (R) in the register shown in FIG. 14 and FIG. 15.

Selected fields in the Primary Address Space Control Element (PASCE) are allocated as follows:

Primary Region Table or Segment Table Origin:

Bits 0-51 of the primary region table or segment table designation in control register 1, with 12 zeros appended on the right, form a 64-bit address that designates the beginning of the primary region table or segment table. It is unpredictable whether the address is real or absolute. This table is called the primary region table or segment table since it is used to translate virtual addresses in the primary address space.

Primary Real Space Control (R):

If bit 58 of control register 1 is zero, the register contains a region table or segment table designation. If bit 58 is one, the register contains a real space designation. When bit 58 is one, a one value of the common segment bit in a translation lookaside buffer representation of a segment table entry prevents the entry and the translation lookaside buffer page table copy it designates from being used when translating references to the primary address space, even with a match between the token origin in control register 1 and the table origin in the translation lookaside buffer entry.

Primary Designation Type Control (DT):

When R is zero, the type of table designation in control register 1 is specified by bits 60 and 61 in the register, as follows:

| Primary Designation Type (DT) control bits | |
|---|---|
| Bits 60 and 61 | Designation Type |
| 11 | Region-first-table |
| 10 | Region-second-table |
| 01 | Region-third-table |
| 00 | Segment-table |

When R is zero, bits 60 and 61 must be 11 binary when an attempt is made to use the PASCE to translate a virtual address in which the leftmost one bit is in bit positions 0-10 of the address. Similarly, bits 60 and 61 must be 11 or 10 binary when the leftmost one bit is in bit positions 11-21 of the address, and they must be 11, 10, or 01 binary when the leftmost one bit is in bit positions 22-32 of the address. Otherwise, an ASCE-type exception is recognized.

Primary Region Table or Segment Table Length (TL):

Bits 62 and 63 of the primary region table designation or segment table designation in control register 1 specify the length of the primary region table or segment table in units of 4,096 bytes, thus making the length of the region table or segment table variable in multiples of 512 entries. The length of the primary region table or segment table, in units of 4,096 bytes, is one more than the TL value. The contents of the length field are used to establish whether the portion of the virtual address (RFX, RSX, RTX, or SX) to be translated by means of the table designates an entry that falls within the table.

Primary Real Space Token Origin:

Bits 0-51 of the primary real space designation in control register 1, with 12 zeros appended on the right, form a 64-bit address that may be used in forming and using translation lookaside buffer entries that provide a virtual equals real translation for references to the primary address space. Although this address is used only as a token and is not used to perform a storage reference, it still must be a valid address; otherwise, an incorrect translation lookaside buffer entry may be used when the contents of control register 1 are used.

The following bits of control register 1 are not assigned and are ignored: bits 52, 53, and 59 if the register contains a region table designation or segment table designation, and bits 52, 53 and 59-63 if the register contains a real space designation.

Control Register 7

Figure 16:
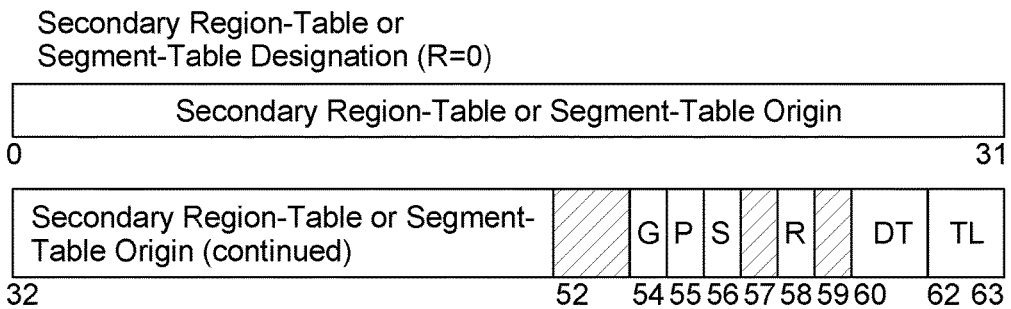
FIG. 16 and FIG. 17 are diagrams of a format of control register 7.
Figure 17:
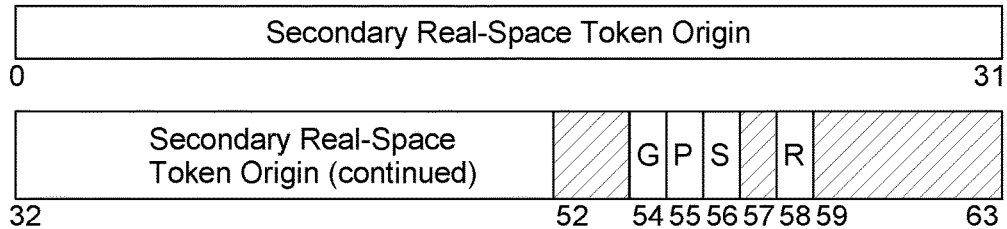

Control register 7 contains the Secondary Address Space Control Element (SASCE). In one embodiment, control register 7 has one of the following two formats, depending on the real space control bit (R) in the register shown in FIG. 16 and FIG. 17.

Control Register 13

Figure 18:
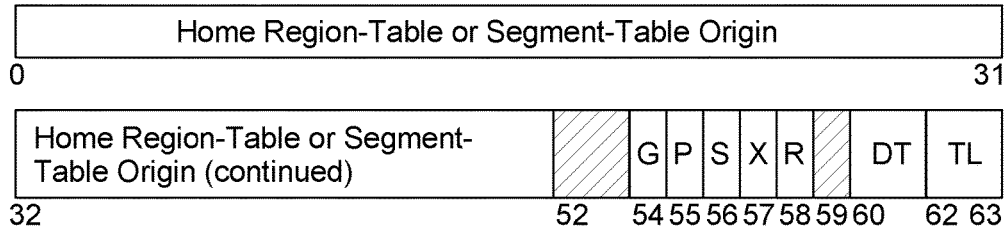
FIG. 18 and FIG. 19 are diagrams of a format of control register 13.
Figure 19:
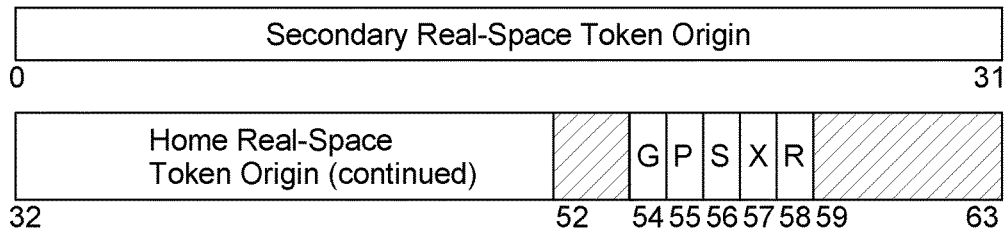

Control register 13 contains the Home Address Space Control Element (HASCE). In one embodiment, control register 13 has one of the following two formats, depending on the real space control bit (R) in the register as shown in FIG. 18 and FIG. 19.

Access Registers

The CPU has 16 access registers numbered 0-15. An access register consists of 32 bit positions containing an indirect specification of an ASCE. An ASCE is a parameter used by the dynamic address translation (DAT) mechanism to translate references to a corresponding address space. When the CPU is in a mode called the access register mode (controlled by bits in the program status word), an instruction B field, used to specify a logical address for a storage operand reference, designates an access register, and the ASCE specified by the access register is used by DAT for the reference being made. For some instructions, an R field is used instead of a B field. Instructions are provided for loading and storing the contents of the access registers and for moving the contents of one access register to another.

Each of access registers 1-15 can designate any address space, including the current instruction space (the primary address space). Access register 0 designates the primary instruction space. When one of access registers 1-15 is used to designate an address space, the CPU determines which address space is designated by translating the contents of the access register. When access register 0 is used to designate an address space, the CPU treats the access register as designating the primary instruction space, and it does not examine the actual contents of the access register. Therefore, the 16 access registers can designate, at any one time, the primary instruction space and a maximum of 15 other spaces.

Program Status Word (PSW)

The program status word includes the instruction address, condition code, and other information used to control instruction sequencing and to determine the state of the CPU. The active or controlling program status word is called the current program status word. It governs the program currently being executed.

The CPU has an interruption capability, which permits the CPU to switch rapidly to another program in response to exceptional conditions and external stimuli. When an interruption occurs, the CPU places the current program status word in an assigned storage location, called the old program status word location, for the particular class of interruption. The CPU fetches a new program status word from a second assigned storage location. This new program status word determines the next program to be executed. When it has finished processing the interruption, the program handling the interruption may reload the old program status word, making it again the current program status word, so that the interrupted program can continue.

There are six classes of interruption: external, I/O, machine check, program, restart, and supervisor call. Each class has a distinct pair of old program status word and new program status word locations permanently assigned in real storage.

Current Program Status Word

The current program status word in the CPU contains information required for the execution of the currently active program. The program status word is 128 bits in length and includes the instruction address, condition code, and other control fields. In general, the program status word is used to control instruction sequencing and to hold and indicate much of the status of the CPU in relation to the program currently being executed. Additional control and status information is contained in control registers and permanently assigned storage locations. The status of the CPU can be changed by loading a new program status word or part of a program status word.

Control is switched during an interruption of the CPU by storing the current program status word, so as to preserve the status of the CPU, and then loading a new program status word. Execution of LOAD PSW or LOAD PSW EXTENDED, or the successful conclusion of the initial program loading sequence, introduces a new program status word. The instruction address is updated by sequential instruction execution and replaced by successful branches. Other instructions are provided which operate on a portion of the program status word.

Figure 20:
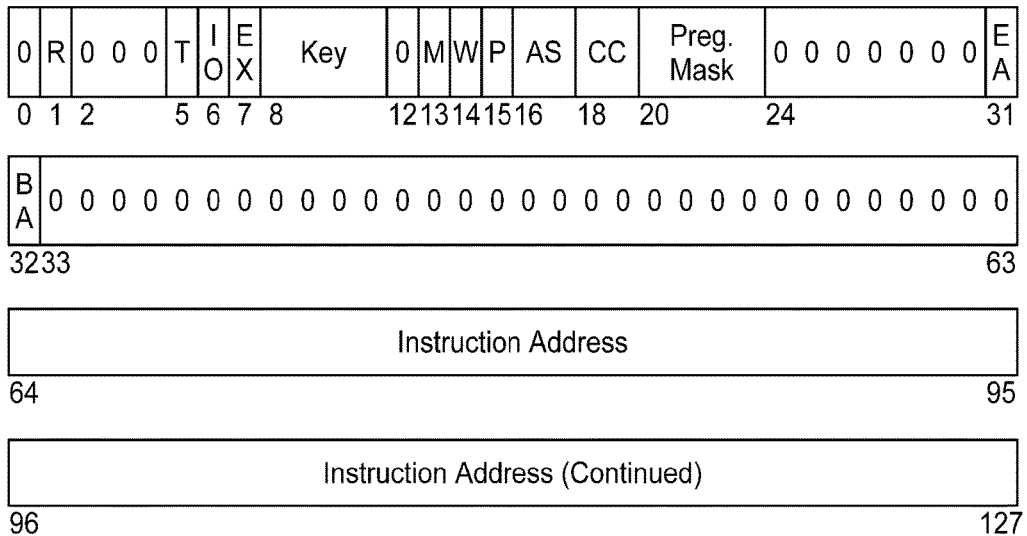
FIG. 20 is a diagram of a program status word format.

A new or modified program status word becomes active (that is, the information introduced into the current program status word assumes control over the CPU) when the interruption or the execution of an instruction that changes the program status word is completed. The interruption for Program Event Recording (PER) associated with an instruction that changes the program status word occurs under control of the PER mask that is effective at the beginning of the operation. Bits 0-7 of the program status word are collectively referred to as the system mask. In one embodiment, the program status word has the format shown in FIG. 20.

Program Status Word Format

The following is a brief summary of the functions of selected program status word fields.

DAT Mode (T):

Bit 5 controls whether implicit dynamic address translation of logical and instruction addresses used to access storage takes place. When bit 5 is zero, DAT is off and logical and instruction addresses are treated as real addresses. When bit 5 is one, DAT is on, and the dynamic address translation mechanism is invoked.

PSW Key:

Bits 8-11 form the access key for storage references by the CPU. If the reference is subject to key controlled protection, the PSW Key is matched with a storage key when information is stored or when information is fetched from a location that is protected against fetching. However, for one of the operands of each of MOVE TO PRIMARY, MOVE TO SECONDARY, MOVE WITH KEY, MOVE WITH SOURCE KEY, and MOVE WITH DESTINATION KEY, an access key specified as an operand is used instead of the PSW Key.

Address Space Control (AS):

Bits 16 and 17, in conjunction with Program Status Word bit 5, control the translation mode.

Condition Code (CC):

Bits 18 and 19 are the two bits of the condition code. The condition code is set to 0, 1, 2, or 3, depending on the result obtained in executing certain instructions. Most arithmetic and logical operations, as well as some other operations, set the condition code. The instruction BRANCH ON CONDITION can specify any selection of the condition code values as a criterion for branching.

Instruction Address:

Bits 64-127 of the program status word are the instruction address. This address designates the location of the leftmost byte of the next instruction to be executed, unless the CPU is in the wait state (bit 14 of the program status word is one).

Address Types & Formats

For purposes of addressing main storage, three basic types of addresses are recognized: absolute, real, and virtual. The addresses are distinguished on the basis of the transformations that are applied to the address during a storage access. Address translation converts a virtual address to a real address. Prefixing converts a real address to an absolute address. In addition to the three basic address types, additional types are defined which are treated as one or another of the three basic types, depending on the instruction and the current mode.

Absolute Address

An absolute address is the address assigned to a main storage location. An absolute address is used for a storage access without any transformations performed on it. The channel subsystem and all CPUs in the configuration refer to a shared main storage location by using the same absolute address. Available main storage is usually assigned contiguous absolute addresses starting at 0, and the addresses are assigned in complete 4 Kilobyte blocks on integral boundaries. An exception is recognized when an attempt is made to use an absolute address in a block which has not been assigned to physical locations. On some models, storage reconfiguration controls may be provided which permit the operator to change the correspondence between absolute addresses and physical locations. However, at any one time, a physical location is not associated with more than one absolute address. Storage consisting of byte locations sequenced according to their absolute addresses is referred to as absolute storage.

Real Address

A real address identifies a location in real storage. When a real address is used for an access to main storage, it is converted, by means of prefixing, to form an absolute address. At any instant there is one real address to absolute address mapping for each CPU in the configuration. When a real address is used by a CPU to access main storage, it may be converted to an absolute address by prefixing. The particular transformation is defined by the value in the prefix register for the CPU. Storage consisting of byte locations sequenced according to their real addresses is referred to as real storage.

Virtual Address

A virtual address identifies a location in virtual storage. When a virtual address is used for an access to main storage, it is translated by means of dynamic address translation, either to a real address which may be subject to prefixing to form an absolute address, or directly to an absolute address.

Primary Virtual Address

A primary virtual address is a virtual address which is to be translated by means of the Primary Address Space Control Element (PASCE). Logical addresses are treated as primary virtual addresses when in the primary space mode. Instruction addresses are treated as primary virtual addresses when in the primary space mode, secondary space mode, or access register mode. The first operand address of MOVE TO PRIMARY and the second operand address of MOVE TO SECONDARY are treated as primary virtual addresses.

Secondary Virtual Address

A secondary virtual address is a virtual address which is to be translated by means of the Secondary Address Space Control Element (SASCE). Logical addresses are treated as secondary virtual addresses when in the secondary space mode. The second operand address of MOVE TO PRIMARY and the first operand address of MOVE TO SECONDARY are treated as secondary virtual addresses.

AR Specified Virtual Address

An AR specified virtual address is a virtual address which is to be translated by means of an Access Register-specified Address Space Control Element. Logical addresses are treated as AR specified addresses when in the access register mode.

Home Virtual Address

A home virtual address is a virtual address which is to be translated by means of the Home Address Space Control Element (HASCE). Logical addresses and instruction addresses are treated as home virtual addresses when in the home space mode.

Instruction Address

Addresses used to fetch instructions from storage are called instruction addresses. Instruction addresses are treated as real addresses in the real mode, as primary virtual addresses in the primary space mode, secondary space mode, or access register mode, and as home virtual addresses in the home space mode. The instruction address in the current program status word and the target address of EXECUTE are instruction addresses.

Effective Address

In some situations, it is convenient to use the term "effective address." An effective address is the address which exists before any transformation by dynamic address translation or prefixing is performed. An effective address may be specified directly in a register or may result from address arithmetic. Address arithmetic is the addition of the base and displacement or of the base, index, and displacement.

Prefixing

Prefixing provides the ability to assign the range of real addresses 0-8191 to a different block in absolute storage for each CPU, thus permitting more than one CPU sharing main storage to operate concurrently with a minimum of interference, especially in the processing of interruptions. Prefixing causes real addresses in the range 0-8191 to correspond one-for-one to the block of 8K byte absolute addresses (the prefix area) identified by the value in bit positions 0-50 of the prefix register for the CPU, and the block of real addresses identified by that value in the prefix register to correspond one-for-one to absolute addresses 0-8191. The remaining real addresses are the same as the corresponding absolute addresses. This transformation allows each CPU to access all of main storage, including the first 8K bytes and the locations designated by the prefix registers of other CPUs.

Figure 21:
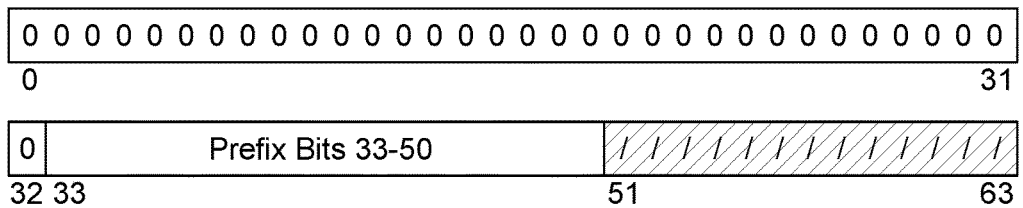
FIG. 21 is a diagram of a format of prefix register.

The prefix is a 51-bit quantity contained in bit positions 0-50 of the prefix register. In one embodiment, the prefix register has the format shown in shown in FIG. 21.

When prefixing is applied, the real address is transformed into an absolute address by using one of the following rules, depending on bits 0-50 of the real address:

1. Bits 0-50 of the address, if all zeros, are replaced with bits 0-50 of the prefix.
2. Bits 0-50 of the address, if equal to bits 0-50 of the prefix, are replaced with zeros.
3. Bits 0-50 of the address, if not all zeros and not equal to bits 0-50 of the prefix, remain unchanged.

Only the address presented to storage is translated by prefixing. The contents of the source of the address remain unchanged.

The distinction between real and absolute addresses is made even when the prefix register contains all zeros, in which case a real address and its corresponding absolute address are identical.

Figure 13:
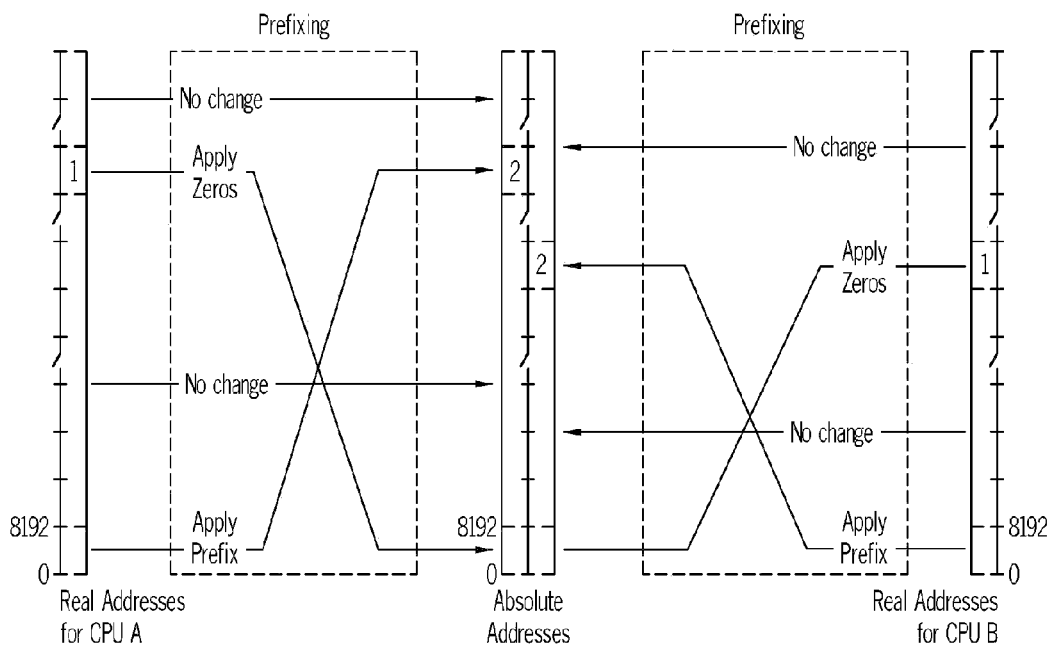
FIG. 13 illustrates the relationship between real and absolute addresses.

FIG. 13 illustrates the relationship between real and absolute addresses.

An address space is a consecutive sequence of integer numbers (virtual addresses); together with the specific transformation parameters which allow each number to be associated with a byte location in storage. The sequence starts at zero and proceeds left to right.

When a virtual address is used by a CPU to access main storage, it is first converted, by means of dynamic address translation (DAT), to a real or absolute address. Real addresses may be further subjected to prefixing to form an absolute address. DAT may use a region first table, region second table, region third table, segment table, and a page table as transformation parameters. The designation (origin and length) of the highest level table for a specific address space is called an Address Space Control Element (ASCE), and it is found for use by DAT in a control register or as specified by an access register. Alternatively, the ASCE for an address space may be a real space designation, which indicates that DAT is to translate the virtual address simply by treating it as a real address and without using any tables.

DAT uses, at different times, the ASCE in different control registers or specified by the access registers. The choice is determined by the translation mode specified in the current program status word. Four translation modes are available: primary space mode, secondary space mode, access register mode, and home space mode. Different address spaces are addressable depending on the translation mode.

At any instant when the CPU is in the primary space mode or secondary space mode, the CPU can translate virtual addresses belonging to two address spaces—the primary address space and the secondary address space. At any instant when the CPU is in the access register mode, it can translate virtual addresses of up to 16 address spaces—the primary address space and up to 15 AR specified address spaces. At any instant when the CPU is in the home space mode, it can translate virtual addresses of the home address space.

The primary address space is identified as such because it consists of primary virtual addresses, which are translated by means of the Primary Address Space Control Element (PASCE). Similarly, the secondary address space consists of secondary virtual addresses translated by means of the Secondary Address Space Control Element (SASCE). The AR specified address spaces consist of AR specified virtual addresses translated by means of Access Register-specified Address Space Control Element (AR specified ASCE), and the home address space consists of home virtual addresses translated by means of the Home Address Space Control Element (HASCE). The primary and secondary ASCEs are in control registers 1 and 7, respectively. The AR specified ASCEs may be in control registers 1 and 7, or in table entries called ASN second table entries. The HASCE is in control register 13.

Dynamic Address Translation

Dynamic address translation is the process of translating a virtual address (during a storage reference, for example) into the corresponding main memory address (real address or absolute address in the embodiment). The virtual address may be a primary virtual address, secondary virtual address, Access Register specified virtual address, or a home virtual address. These addresses are translated by means of the PASCE, SASCE, AR-specified ASCE, or the HASCE, respectively. After selection of the appropriate ASCE, the translation process is the same for all of the four types of virtual address.

Addressing Translation Mode

An effective address is the address (virtual address) which exists before any transformation by dynamic address translation or prefixing is performed. The three bits in the program status word that control dynamic address translation are bit 5, the DAT mode bit, and bits 16 and 17, the address space control bits. When the DAT mode bit is zero, then DAT is off, and the CPU is in the real mode. When the DAT mode bit is one, then DAT is on, and the CPU is in the translation mode designated by the address space control bits: binary 00 designates the primary space mode, binary 01 designates the access register mode, binary 10 designates the secondary space mode, and binary 11 designates the home space mode. The various modes are shown below, along with the handling of addresses in each mode.

| Translation Modes | | | | | | |
|---|---|---|---|---|---|---|
| PSW Bit | | | | | Handling of Addresses | |
| 5 | 5 | 5 | DAT | Mode | Instruction Addresses | Instruction Addresses |
| 0 | 0 | 0 | Off | Real mode | Real | Real |
| 0 | 0 | 1 | Off | Real mode | Real | Real |
| 0 | 1 | 0 | Off | Real mode | Real | Real |
| 0 | 1 | 1 | Off | Real mode | Real | Real |
| 1 | 0 | 0 | On | Primary-space mode | Primary virtual | Primary virtual |
| 1 | 0 | 1 | On | Access-register mode | Primary virtual | AR-specified virtual |
| 1 | 1 | 0 | On | Secondary-space mode | Primary virtual | Secondary virtual |
| 1 | 1 | 1 | On | Home-space space mode | Home virtual | Home virtual |

The Program Status Word is a 128 bit word which, in part, provides 2 bits which indicate the addressing mode. In one embodiment, bit 31 is the Extended Addressing Mode (EA) bit and bit 32 is the Base Addressing Mode (BA) bit. These two bits indicate the size of addresses. The state of each of these two bits is binary (1 or 0). If the EA bit is 0 and the BA bit is 0 then 24-bit addressing is indicated. If 24-bit addressing is indicated, bits 40-63 of a 64-bit word (a 64-bit entity is commonly called a doubleword) is where the address is located. Where the instruction address occupies the second 64 bits of a 128-bit entity (a quadword), the bit positions in the program status word are as follows. In 24-bit mode, the instruction address is in bits 104-127 of the program status word. In the 31-bit mode, the instruction address is in bits 97-127 of the program status word. In 64-bit mode, the instruction address is in bits 64-127 of the program status word. If the EA bit is 0 and the BA bit is 1 then 31-bit addressing is indicated. The appropriate 64-bit word contains a 31-bit address located at bit positions 33-63. If the EA bit is 1 and the BA bit is 1 then bits 0-63, which is the entire 64-bits, of a 64-bit word contains the address. Otherwise, an exception condition is indicated. Once the addressing mode has been obtained, the ASCE needs to be determined.

Address Space Control Element (ASCE)

Figure 3:
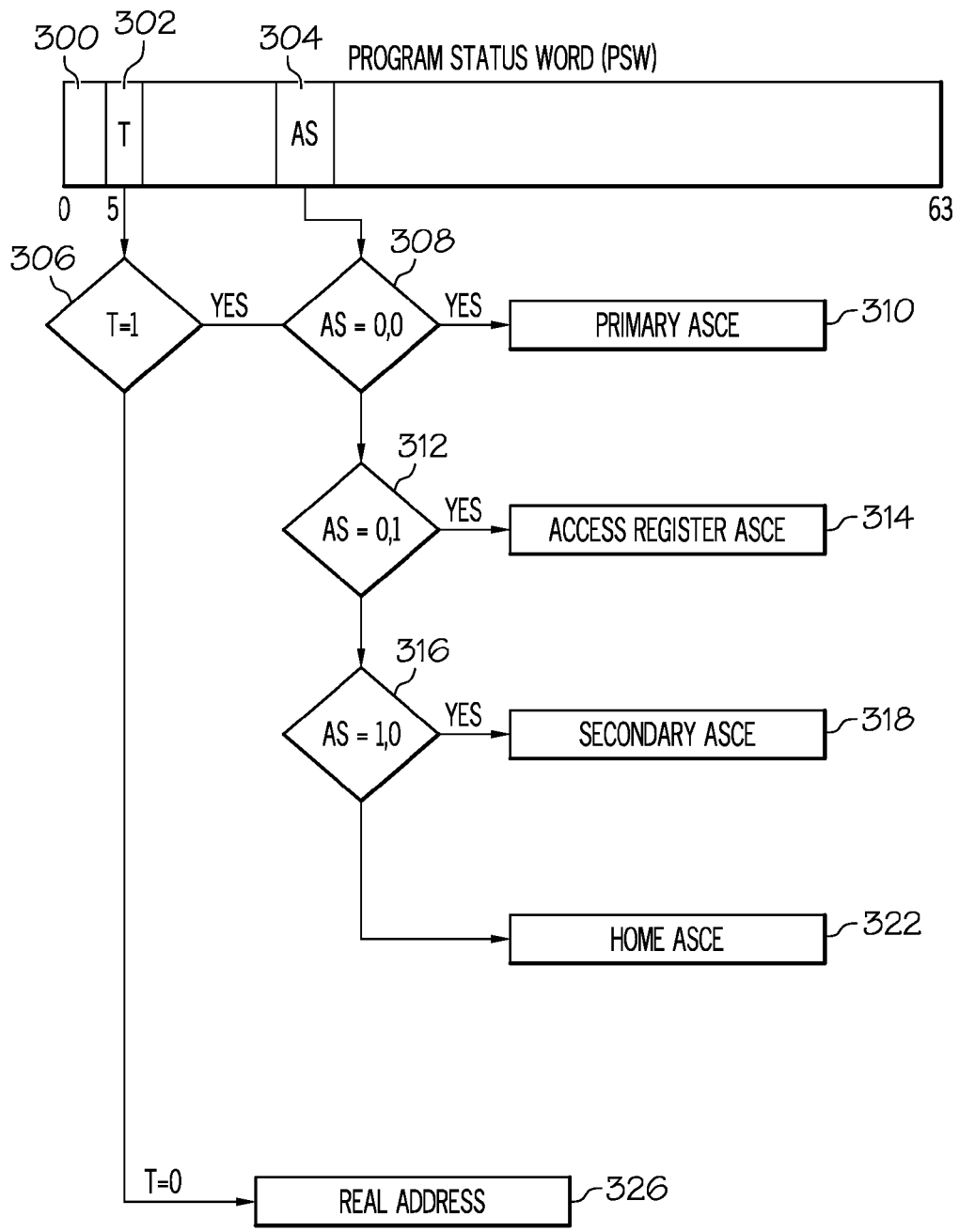
FIG. 3 illustrates one embodiment of how the program status word is used to determine the effective ASCE for dynamic address translation of the virtual address.

Reference is now being made to FIG. 3 which illustrates one embodiment of how the Program Status Word is used to determine the effective Address Space Control Element (ASCE) for dynamic address translation of the virtual address. The ASCE may specify, for example, a 2 Gigabytes (Giga=$2^{30}$) address space. Or, it may specify, for example, 4 Terabytes (Tera=$2^{40}$), 8 Petabytes (Peta=$2^{50}$), or a 16 Exabytes (Exa=$2^{60}$) address space. Or, it may specify a real-space designation. A real space designation causes the virtual address to be treated as a real address in storage without referencing one or more address translation tables.

The Program Status Word 300 contains a translation (T) bit 302 and Address Space (AS) bits 304. At 306, if the translation (T) bit is zero then the address is a real address 326. If, at 308, the Address Space (AS) equals zero (binary 00) then the effective ASCE for this virtual address is the Primary Address Space Control Element (PASCE) 310. If, at 312, the Address Space (AS) equals one (binary 01) then the effective ASCE is the Access Register-specified Address Space Control Element 314. If, at 316, an Address Space (AS) equals two (binary 10) then the effective ASCE is the Secondary Address Space Control Element (SASCE) 318.

Otherwise, the Address Space (AS) equals three (binary 11) and the effective ASCE is the Home Address Space Control Element (HASCE) 322.

After selection of the effective ASCE, the process of dynamic address translation is preferably the same for all four types of virtual addresses.

A segment table designation or region table designation causes translation to be performed by means of tables established by the operating system in real or absolute storage. A real space designation causes the virtual address simply to be treated as a real address, without the use of tables in storage.

In the process of translation when using a segment table designation or a region table designation, three types of units of information are recognized—regions, segments, and pages. A region is a block of sequential virtual addresses spanning 2 Gigabytes and beginning at a 2 Gigabyte boundary. A segment is a block of sequential virtual addresses spanning 1 Megabytes and beginning at a 1 Megabyte boundary. A page is a block of sequential virtual addresses spanning 4 Kilobytes and beginning at a 4 Kilobyte boundary.

Virtual Address Format

Figure 22:
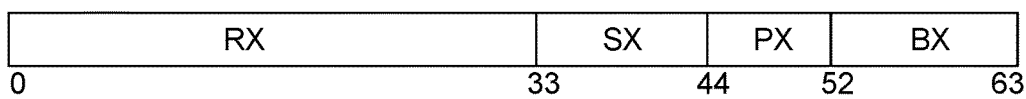
FIG. 22 is a diagram of a format of the virtual address.

Translation of a virtual address may involve referencing a plurality of translation tables of a hierarchy of translation tables to obtain a real or absolute address. The real address may be further subject to a prefixing operation to form an absolute address. The virtual address contains indexes to entries in translation tables in the hierarchy of translation tables. The virtual address, accordingly, is divided into four principal fields. Bits 0-32 are called the region index (RX), bits 33-43 are called the segment index (SX), bits 44-51 are called the page index (PX), and bits 52-63 are called the byte index (BX). In one embodiment, the virtual address has the format as shown in FIG. 22.

Figure 23:
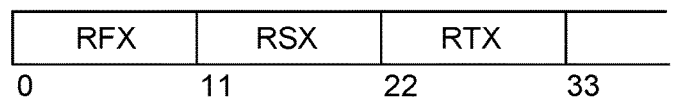
FIG. 23 is a diagram of a format of RX of the virtual address.

As determined by its ASCE, a virtual address space may be a 2 Gigabyte space consisting of one region, or it may be up to a 16 Exabyte space consisting of up to 8 Gigabyte regions. The RX part of a virtual address applying to a 2 Gigabyte address space must be all zeros; otherwise, an exception is recognized. The RX part of a virtual address is itself divided into three fields. Bits 0-10 are called the region first index (RFX), bits 11-21 are called the region second index (RSX), and bits 22-32 are called the region third index (RTX). In one embodiment, bits 0-32 of the virtual address have the format shown in FIG. 23.

A virtual address in which the RTX is the leftmost significant part (a 42-bit address) is capable of addressing 4 Terabytes (2048 regions), one in which the RSX is the leftmost significant part (a 53-bit address) is capable of addressing 8 Petabytes (4,193,044 regions), and one in which the RFX is the leftmost significant part (a 64-bit address) is capable of addressing 16 Exabytes (8,589,934, 592 regions).

A virtual address in which the RX is zero can be translated into real addresses by means of two translation tables: a segment table and a page table. With the EDAT facility enabled, the translation may be completed with only the segment table. The RFX may be non-zero, in which case a region first table, region second table, and region third table, are required. If the RFX is zero, but the RSX may be non-zero, a region second table and region third table are required. If the RFX and RSX are zero, but the RTX may be non-zero, a region third table is required.

Figure 4:
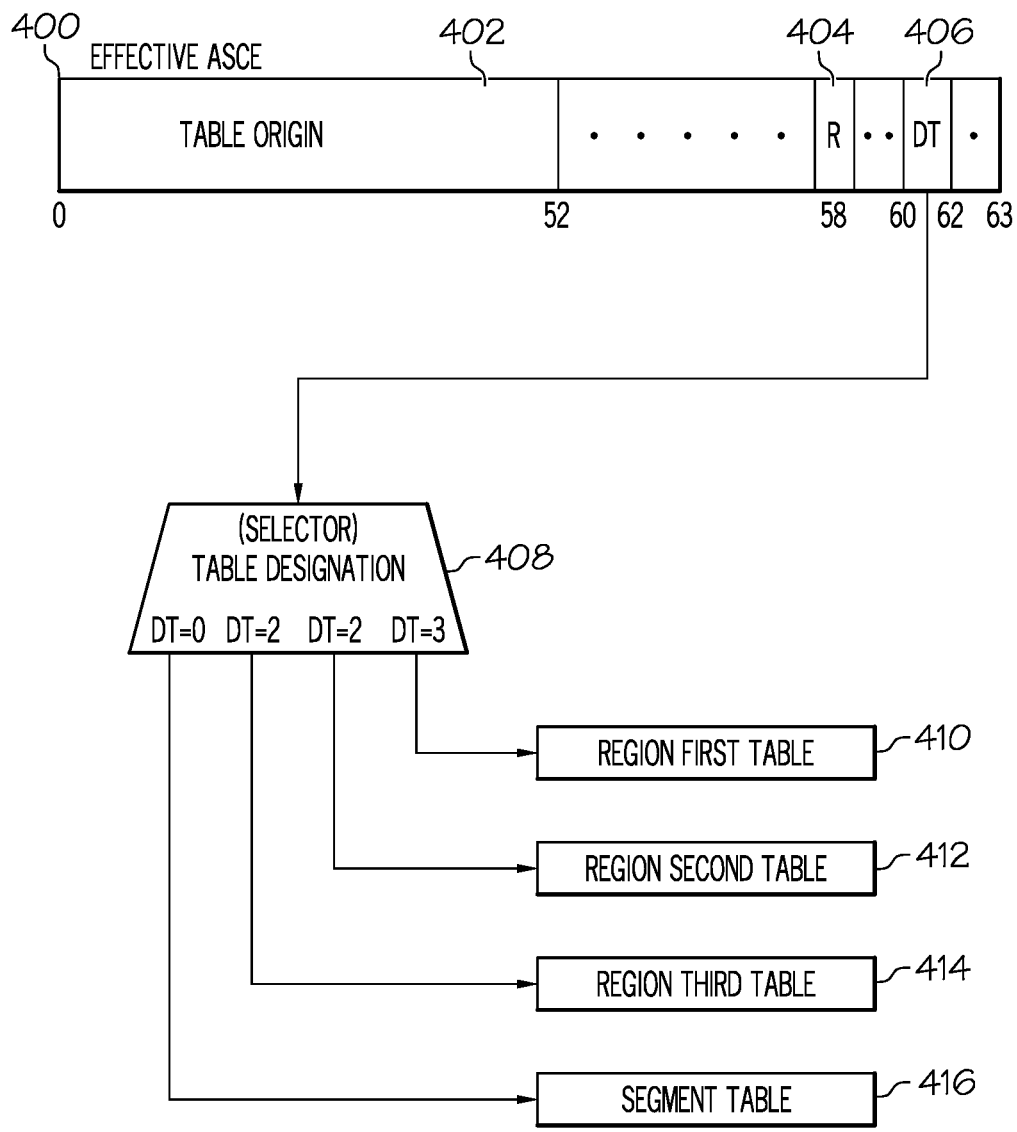
FIG. 4 illustrates one embodiment wherein the effective ASCE determined in FIG. 3 is used to determine the highest translation table in the hierarchy of translation tables used in translation of the virtual address.

An exception is recognized if the ASCE for an address space does not designate the highest level of table (beginning with the region first table and continuing downward to the segment table) needed to translate a reference to the address space Dynamic Translation of the Virtual Address Reference is now being made to FIG. 4 illustrating one embodiment wherein the effective ASCE determined in FIG. 3 is used to determine the first translation table in the hierarchy of translation tables used in translation of the virtual address.

In one embodiment, control register 1 (CR1) contains the PASCE. Control register 7 (CR7) contains the SASCE. Control register 13 (CR13) contains the HASCE, and an Address-Space-Second-table Entry (ASTE) that is derived by the Access-Register-Translation (ART) process contains an Access Register-specified Address Space Control Element. An effective ASCE 400 is selected from one of these locations.

A first portion of the effective ASCE 400 contains a table origin 402 which contains an origin address designating either a region first table, a region second table, a region third table, or a segment table. The table origin (bits 0 . . . 51) is appended with 12 binary zeros to form a 64-bit origin address of the highest translation table in the hierarchy of translation tables to be used in translation of the virtual address. Effective ASCE 400 also contains a real space control (R) bit 404 and DT bits 406. If the real space control (R) bit is zero then the DT bits are decoded by selector 408 to determine which particular origin address is table origin 402. If the DT bits equal three (binary 11) then table origin 402 designates a region first table 410. If the DT bits equal two (binary 10) then table origin 402 designates a region second table 412. If the DT bits equal one (binary 01) then table origin 402 designates a region third table 414. Otherwise, if the DT bits equal zero (binary 00) then table origin 402 designates a segment table 416.

A region first table, region second table, or region third table is sometimes referred to simply as a region table. Similarly, a region first table designation, region second table designation, or region third table designation is sometimes referred to as a region table designation. The region, segment, and page tables reflect the current assignment of real storage. Page is a term used for the assignment of virtual storage. Real storage is allotted in fixed blocks. Pages need not be adjacent in real storage even though assigned to a set of sequential virtual addresses.

When the ASCE used in a translation is a region first table designation, the translation process consists in a multi-level lookup using, for example, a region first table, a region second table, a region third table, a segment table, and optionally a page table. These tables reside in real or absolute storage. When the ASCE is a region second table designation, region third table designation, or segment table designation, the lookups in the levels of tables above the designated level are omitted, and the higher level tables themselves are omitted.

Figure 5A:
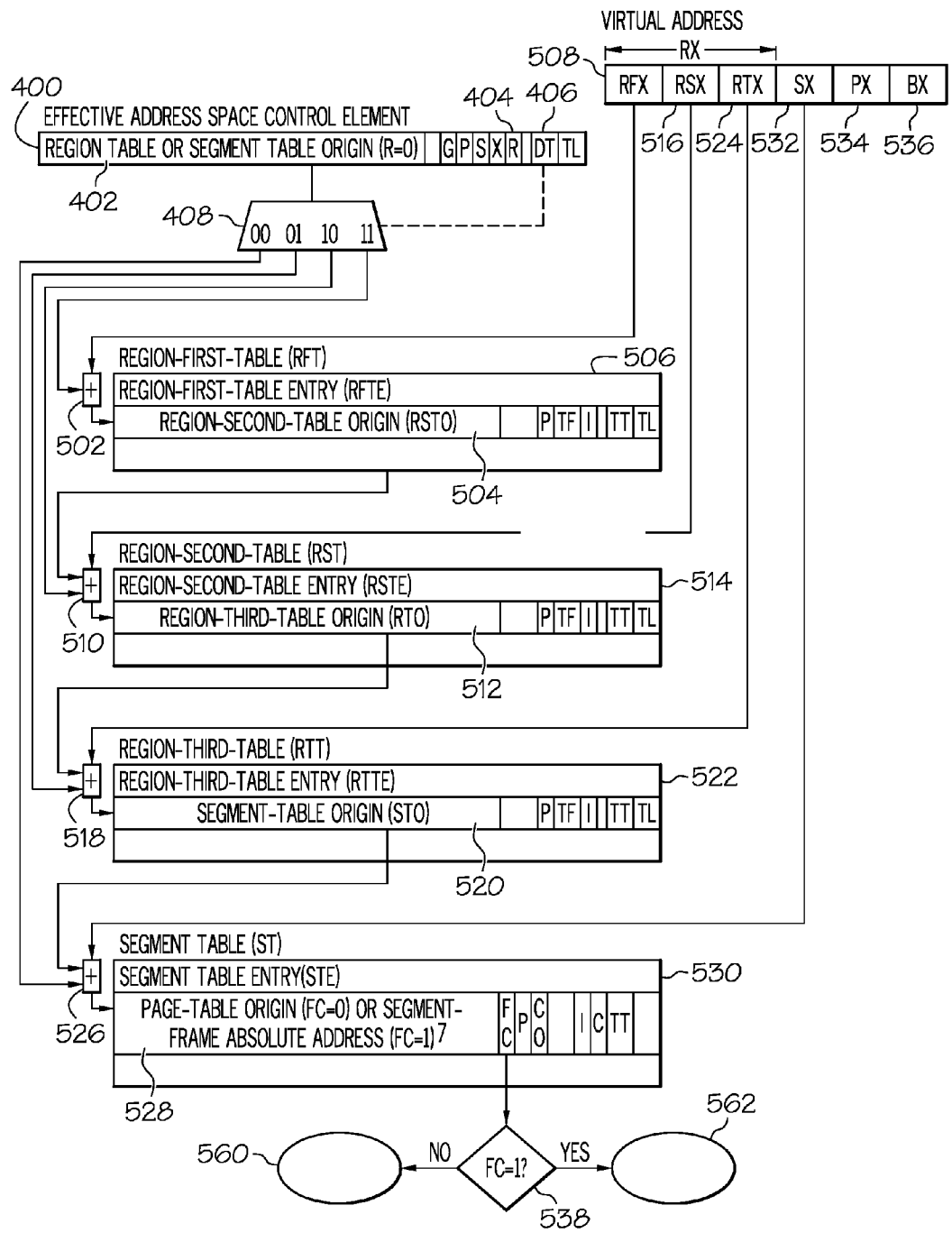
FIG. 5A illustrates one embodiment of the process of dynamic address translation of a virtual address using a hierarchy of translation tables to the segment table level.

Reference is now being made to FIG. 5A illustrating one embodiment of dynamic address translation of a virtual address using a hierarchy of translation tables.

The effective ASCE 400 of FIG. 4 contains the Designation Type (DT) bits 406. If the real space control (R) 404 bit of the ASCE is zero then the DT bits are decoded by selector 408 to determine which origin address table origin 402 designates. If the real space control (R) bit is one then dynamic address translation takes place as shown at node D 564 in FIG. 5B.

If the DT bits equal three (binary 11) in selector 408 then the designated first table in the hierarchy of translation tables is a region first table. Table origin 402 is arithmetically added, at 502, with a Region First Index (RFX) 508 portion of the virtual address to reference region first table entry 506 in a region first table. The table origin (either with 12 zeros appended on the right, or multiplied by 4096) is added to the product of the index multiplied by 8 (or the index with three zeros appended on the right). The region first table entry contains a region second table origin 504 to a next lower table in the hierarchy of translation tables used in translation. The next lower table to the region first table is the region second table. If the invalid (I) bit of the region first table entry is equal to one then the region first table entry is invalid and cannot be used in translation. An exception condition is indicated.

If the DT bits equal two (binary 10) in selector 408 then the designated first table in the hierarchy of translation tables is a region second table. Table origin 402 is arithmetically added, at 510, with a Region Second Index (RSX) 516 portion of the virtual address to reference region second table entry 514 in a region second table. The table origin (either with 12 zeros appended on the right, or multiplied by 4096) is added to the product of the index multiplied by 8 (or the index with three zeros appended on the right). The region second table entry contains a region third table origin 512 to a next lower table in the hierarchy of translation tables used in translation. The next lower table to the region second table is the region third table. If the invalid (I) bit of the region second table entry is equal to one then the region second table entry is invalid and an exception condition is indicated.

If the DT bits equal one (binary (01) in selector 408 then the designated first table in the hierarchy of translation tables is a region third table. Table origin 402 is arithmetically added, at 518, with a Region Third Index (RTX) 524 portion of the virtual address to reference region third table entry 522 in a region third table. The table origin (either with 12 zeros appended on the right, or multiplied by 4096) is added to the product of the index multiplied by 8 (or the index with three zeros appended on the right). The region third table entry contains a segment table origin 520 to a next lower table in the hierarchy of translation tables used in translation. The next lower table to the region third table is the segment table. If the invalid (I) bit of the region third table entry is equal to one then the region third table entry is invalid and an exception condition is indicated.

If the DT bits equal zero (binary (00) in selector 408 then the designated first table in the hierarchy of translation tables is a segment table. Table origin 402 is arithmetically added, at 526, with a Segment Index (SX) 532 portion of the virtual address to reference segment table entry 530 in a segment table. The table origin (either with 12 zeros appended on the right, or multiplied by 4096) is added to the product of the index multiplied by 8 (or the index with three zeros appended on the right). The segment table entry contains either an origin address to a page table or a segment frame absolute address (SFAA), either shown at 528. If the invalid (I) bit of the segment table entry is equal to one then the segment table entry is invalid and an exception condition is indicated.

At 538, the STE format control (FC) bit of the segment table is examined. If the STE format control is one then the segment table entry 530 contains a segment frame absolute address (SFAA) 552 and dynamic address translation continues with reference to node 562 in FIG. 5C. Otherwise, the segment table entry obtained from the segment table contains a page table origin address and dynamic address translation continues with reference to node 560 in FIG. 5B.

Figure 5B:
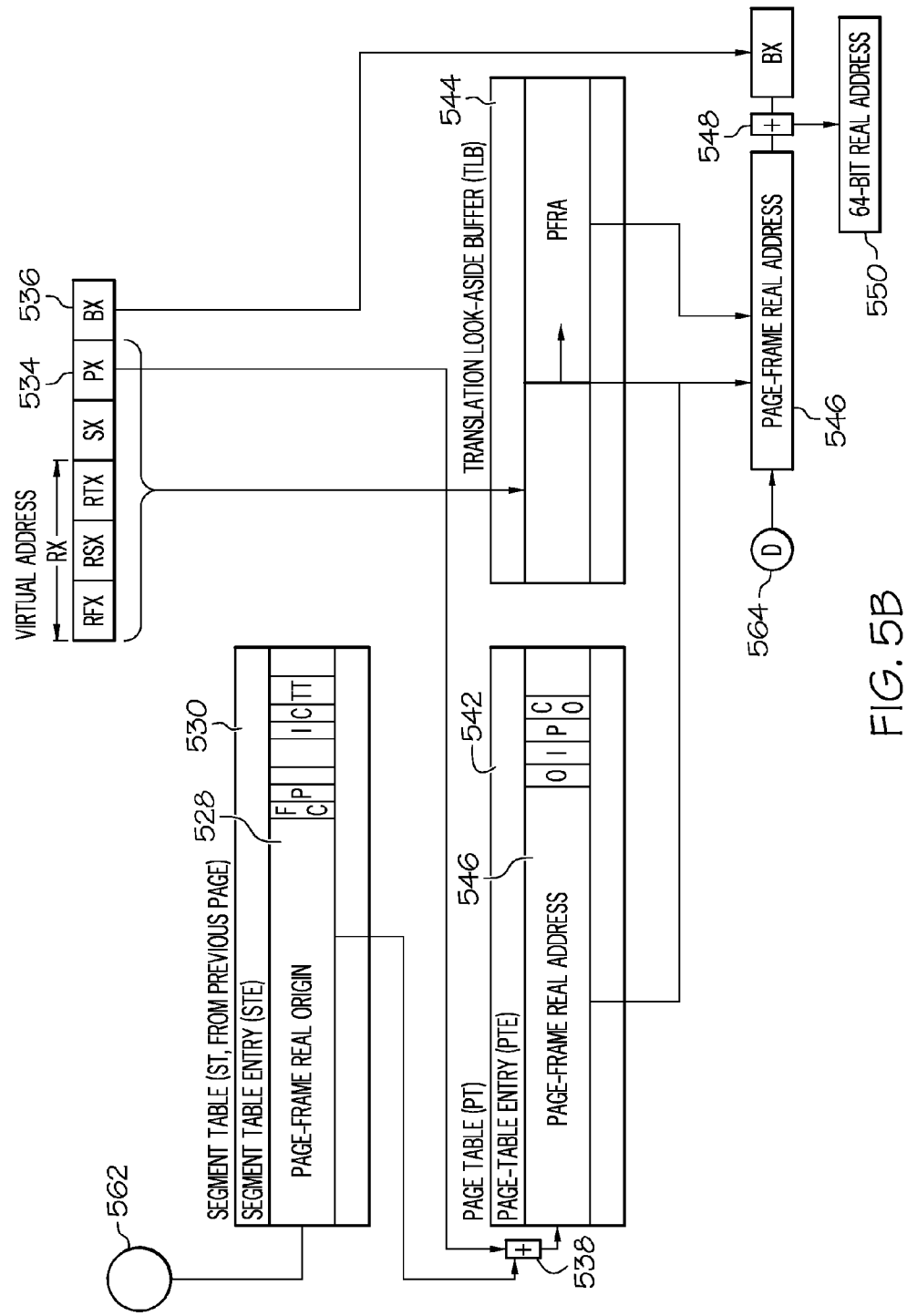
FIG. 5B illustrates a continuation of the dynamic address translation of FIG. 5A wherein the Segment Table Entry (STE) format control (FC) is zero.

With reference now being made to FIG. 5B. If the STE format control in the segment table entry is zero then the segment table entry obtained from the segment table contains an origin address to the next lower table in the hierarchy of translation tables. The next lower table to the segment table is a page table. The page table origin 528, obtained from segment table entry 530 of FIG. 5A, is arithmetically added, at 538, with a Page Index (PX) 534 portion of the virtual address to reference page table entry 542 in a page table. The page table entry contains a page frame real address (PFRA) 546. When the leftmost bits of the page frame real address are concatenated, at 548, with a byte index (BX) 536 portion of the virtual address, a 64-bit real address 550 is obtained. The real 64-bit address may be further subjected to a prefixing operation to form an absolute address. The translated virtual address references a desired 4 Kilobyte (4096 bytes) block of data in main storage or memory.

Preferably, information used in dynamic translation of a virtual address to a memory address is stored in a translation lookaside buffer entry tag along with the address of the block of memory associated with the virtual address. Subsequent storage access can quickly translate a virtual address by comparing ASCE information and virtual address information with translation lookaside buffer tags. If a tag is found to be that of the virtual address, the translation lookaside buffer address of the block of memory can be used instead of performing the slow sequential access of each translation table involved. In one embodiment, the page frame real address (PFRA) along with a tag consisting of, for example, the ASCE and the RX, SX, and PX portions of the virtual address are stored in an entry of the translation lookaside buffer 544. Subsequent translation of this virtual address is thereafter derived from the information stored in the translation lookaside buffer.

Figure 5C:
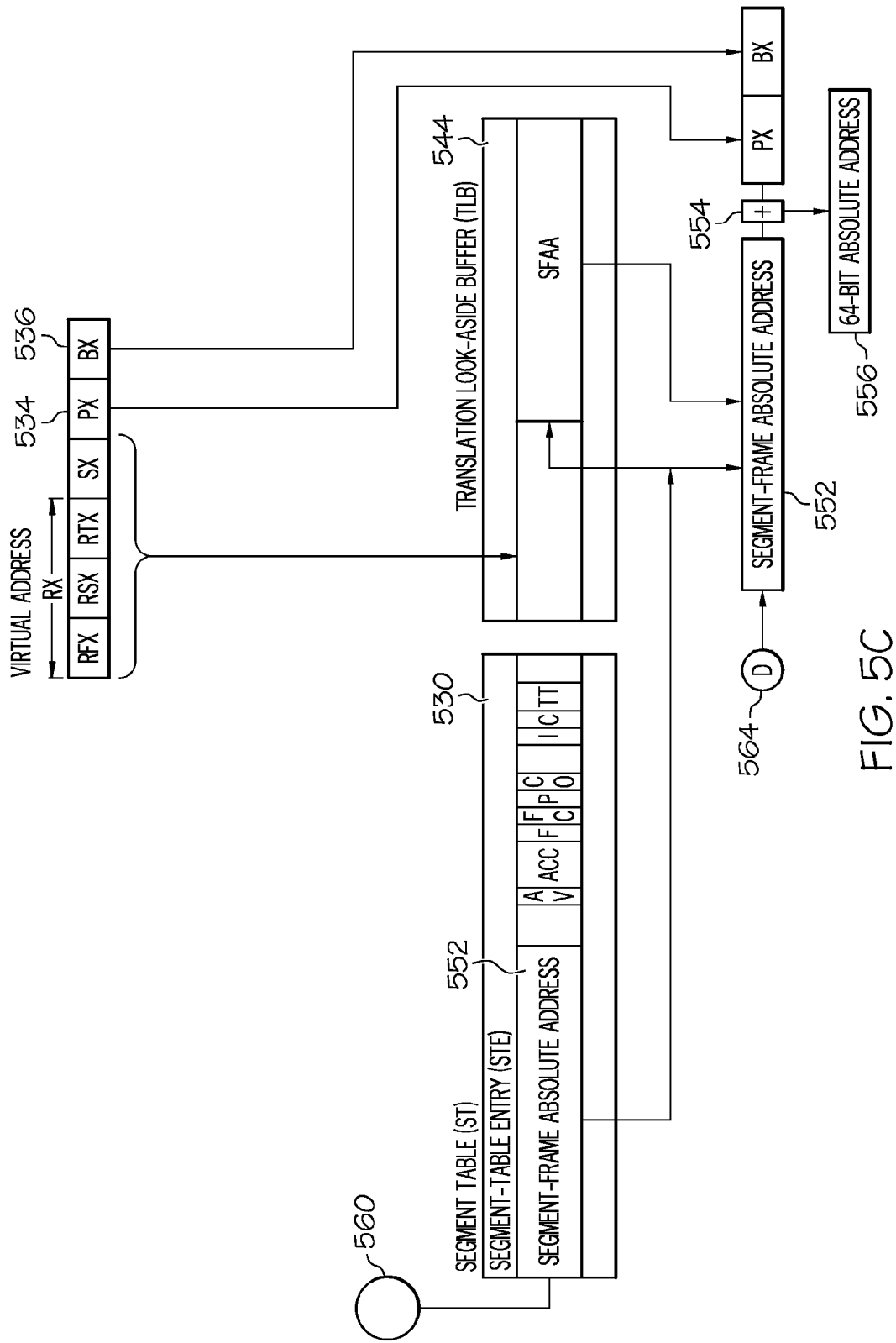
FIG. 5C illustrates a continuation of the dynamic address translation of FIG. 5A wherein the Segment Table Entry (STE) format control (FC) is one.

With reference now being made to FIG. 5C. If the STE format control in the segment table entry 530 is one then the segment table entry contains a segment frame absolute address (SFAA) 552. When the leftmost bits of the segment frame absolute address are concatenated, at 554, with a page index 534 portion and a byte index 536 portion of the virtual address, a 64-bit absolute address 556 is obtained. The translated virtual address references a desired large block of data in main storage or memory. The large block of data is at least 1 megabyte (1,048,576 bytes) in size.

In one embodiment, the segment frame absolute address (SFAA) along with the RX and SX portions of the virtual address are stored in a translation lookaside buffer 544. Subsequent translation of this virtual address is thereafter derived from the information stored in the translation lookaside buffer.

Translation Table Entry Formats

Embodiments of the various translation table entries in the hierarchy of translation tables used in translation are as follows.

Region Table Entries

The term "region table entry" means a region first table entry, region second table entry, or region third table entry. The entries fetched from the region first table, region second table, and region third table have the following formats. The level (first, second, or third) of the table containing an entry is identified by the table type (TT) bits in the entry.

In one embodiment, the formats of the region first table entry, the region second table entry, and the region third table entry is shown in FIG. 24, FIG. 25 and FIG. 26:

Format of the Region Table Entries

Region Second Table Origin, Region Third Table Origin, and Segment Table Origin:

A region first table entry contains a region second table origin. A region second table entry contains a region third table origin. A region third table entry contains a segment table origin. The following description applies to each of the three table origins. Bits 0-51 of the entry, with 12 zeros appended on the right, form a 64-bit address that designates the beginning of the next lower level table.

DAT Protection Bit (P):

When enhanced DAT applies, bit 54 is treated as being OR'ed with the DAT protection bit in each subsequent region table entry, segment table entry, and, when applicable, page table entry used in the translation. Thus, when the bit is one, DAT protection applies to the entire region or regions specified by the region table entry. When the enhanced DAT facility is not installed, or when the facility is installed but the enhanced DAT enablement control is zero, bit 54 of the region table entry is ignored.

Region Second Table Offset, Region Third Table Offset, and Segment Table Offset (TF):

A region first table entry contains a region second table offset. A region second table entry contains a region third table offset. A region third table entry contains a segment table offset. The following description applies to each of the three table offsets. Bits 56 and 57 of the entry specify the length of a portion of the next lower level table that is missing at the beginning of the table, that is, the bits specify the location of the first entry actually existing in the next lower level table. The bits specify the length of the missing portion in units of 4,096 bytes, thus making the length of the missing portion variable in multiples of 512 entries. The length of the missing portion, in units of 4,096 bytes, is equal to the TF value. The contents of the offset field, in conjunction with the length field, bits 62 and 63, are used to establish whether the portion of the virtual address (RSX, RTX, or SX) to be translated by means of the next lower level table designates an entry that actually exists in the table.

Region Invalid Bit (I):

Bit 58 in a region first table entry or region second table entry controls whether the set of regions associated with the entry is available. Bit 58 in a region third table entry controls whether the single region associated with the entry is available. When bit 58 is zero, address translation proceeds by using the region table entry. When the bit is one, the entry cannot be used for translation.

Table Type Bits (TT):

Bits 60 and 61 of the region first table entry, region second table entry, and region third table entry identify the level of the table containing the entry, as follows: Bits 60 and 61 must identify the correct table level, considering the type of table designation that is the ASCE being used in the translation and the number of table levels that have so far been used; otherwise, a translation specification exception is recognized. The following table shows the table type bits:

| Table Type bits for region table Entries | |
|---|---|
| Bits 60 and 61 | Region-Table Level |
| 11 | First |
| 10 | Second |
| 01 | Third |

Region Second Table Length, Region Third Table Length, and Segment Table Length (TL):

A region first table entry contains a region second table length. A region second table entry contains a region third table length. A region third table entry contains a segment table length. The following description applies to each of the three table lengths. Bits 62 and 63 of the entry specify the length of the next lower level table in units of 4,096 bytes, thus making the length of the table variable in multiples of 512 entries. The length of the next lower level table, in units of 4,096 bytes, is one more than the TL value. The contents of the length field, in conjunction with the offset field, bits 56 and 57, are used to establish whether the portion of the virtual address (RSX, RTX, or SX) to be translated by means of the next lower level table designates an entry that actually exists in the table. All other bit positions of the region table entry are reserved for possible future extensions and should contain zeros; otherwise, the program may not operate compatibly in the future. When enhanced DAT applies, the reserved bit positions of the region table entry should contain zeros even if the table entry is invalid.

Segment Table Entries

When enhanced DAT does not apply, or when enhanced DAT applies and the STE format control, bit 53 of the segment table entry is zero, the entry fetched from the segment table, in one embodiment, has the format shown in FIG. 27.

Format I of a Segment Table Entry

When enhanced DAT applies and the STE format control is one, the entry fetched from the segment table, in one embodiment, has the format shown in FIG. 27.

Format II of a Segment Table Entry

As shown in FIG. 28, the selected fields in the segment table entry are allocated as follows:

Page Table Origin:

When enhanced DAT does not apply, or when enhanced DAT applies but the STE format control, bit 53 of the segment table entry, is zero, bits 0-52, with 11 zeros appended on the right, form a 64-bit address that designates the beginning of a page table. It is unpredictable whether the address is real or absolute.

Segment Frame Absolute Address (SFAA):

When enhanced DAT applies and the STE format control is one, bits 0-43 of the entry, with 20 zeros appended on the right, form the 64-bit absolute address of the segment.

ACCF Validity Control (AV):

When enhanced DAT applies and the STE format control is one, bit 47 is the access control bits and fetch protection bit (ACCF) validity control. When the AV control is zero, bits 48-52 of the segment table entry are ignored. When the AV control is one, bits 48-52 are used as described below.

Access Control Bits (ACC):

When enhanced DAT applies, the STE format control is one, and the AV control is one, bits 48-51 of the segment table entry contain the access control bits that may be used for any key controlled access checking that applies to the address.

Fetch Protection Bit (F):

When enhanced DAT applies, the STE format control is one, and the AV control is one, bit 52 of the segment table entry contains the fetch protection bit that may be used for any key controlled access checking that applies to the address.

STE Format Control (FC):

When enhanced DAT applies, bit 53 is the format control for the segment table entry, as follows:

When the FC bit is zero, bits 0-52 of the entry form the page table origin, and bit 55 is reserved.

When the FC bit is one, bits 0-43 of the entry form the segment frame absolute address, bit 47 is the ACCF validity control, bits 48-51 are the access control bits, bit 52 is the fetch protection bit, and bit 55 is the change recording override. When enhanced DAT does not apply, bit 53 is ignored.

DAT Protection Bit (P):

Bit 54, when one, indicates that DAT protection applies to the entire segment.

When enhanced DAT does not apply, bit 54 is treated as being OR'ed with the DAT protection bit in the page table entry used in the translation.

When enhanced DAT applies, the DAT protection bit in any and all region table entries used in the translation are treated as being OR'ed with the DAT protection bit in the segment table entry; when the STE format control is zero, the DAT protection bit in the STE is further treated as being OR'ed with the DAT protection bit in the page table entry.

Change Recording Override (CO):

When enhanced DAT applies, and the STE format control is one, bit 55 of the segment table entry is the change recording override for the segment. When enhanced DAT does not apply, or when enhanced DAT applies but the STE format control is zero, bit 55 of the segment table entry is ignored.

Segment Invalid Bit (I):

Bit 58 controls whether the segment associated with the segment table entry is available.

When the bit is zero, address translation proceeds by using the segment table entry.

When the bit is one, the segment table entry cannot be used for translation.

Common Segment Bit (C):

Bit 59 controls the use of the translation lookaside buffer copies of the segment table entry. When enhanced DAT does not apply or when enhanced DAT applies but the format control is zero, bit 59 also controls the use of the translation lookaside buffer copies of the page table designated by the segment table entry.

A zero identifies a private segment; in this case, the segment table entry and any page table it designates may be used only in association with the segment table origin that designates the segment table in which the segment table entry resides.

A one identifies a common segment; in this case, the segment table entry and any page table it designates may continue to be used for translating addresses corresponding to the segment index, even though a different segment table is specified.

However, translation lookaside buffer copies of the segment table entry and any page table for a common segment are not usable if the private space control, bit 55, is one in the ASCE used in the translation or if that ASCE is a real space designation. The common segment bit must be zero if the segment table entry is fetched from storage during a translation when the private space control is one in the ASCE being used. Otherwise, a translation specification exception is recognized.

Table Type Bits (TT):

Bits 60 and 61 of the segment table entry are 00 binary to identify the level of the table containing the entry. The meanings of all possible values of bits 60 and 61 in a region table entry or segment table entry as shown in FIG. 29

Table Type Bits 60, 61

Bits 60 and 61 must identify the correct table level, considering the type of table designation that is the ASCE being used in the translation and the number of table levels that have so far been used; otherwise, a translation specification exception is recognized. All other bit positions of the segment table entry are reserved for possible future extensions and should contain zeros; otherwise, the program may not operate compatibly in the future. When enhanced DAT applies, the reserved bit positions of the segment table entry should contain zeros even if the table entry is invalid.

Page Table Entries

In one embodiment, the entry fetched from the page table has the format shown in FIG. 30.

Format of a Page Table Entry

Selected fields in the page table entry are allocated as follows:

Page Frame Real Address (PFRA):

Bits 0-51 provide the leftmost bits of a real storage address. When these bits are concatenated with the 12-bit byte index field of the virtual address on the right, a 64-bit real address is obtained.

Page Invalid Bit (I):

Bit 53 controls whether the page associated with the page table entry is available. When the bit is zero, address translation proceeds by using the page table entry. When the bit is one, the page table entry cannot be used for translation.

DAT Protection Bit (P):

Bit 54 controls whether store accesses can be made in the page. This protection mechanism is in addition to the key controlled protection and low address protection mechanisms. The bit has no effect on fetch accesses. If the bit is zero, stores are permitted to the page, subject to the following additional constraints:

The DAT protection bit being zero in the segment table entry used in the translation.

When enhanced DAT applies, the DAT protection bit being zero in all region table entries used in the translation.

Other Protection Mechanisms

If the bit is one, stores are disallowed. When no higher priority exception conditions exist, an attempt to store when the DAT protection bit is one causes a protection exception to be recognized. The DAT protection bit in the segment table entry is treated as being OR'ed with bit 54 when determining whether DAT protection applies to the page. When enhanced DAT applies, the DAT protection bit in any region table entries used in translation are also treated as being OR'ed with bit 54 when determining whether DAT protection applies.

Change Recording Override (CO):

When enhanced DAT does not apply, bit 55 of the page table entry must contain zero; otherwise, a translation specification exception is recognized as part of the execution of an instruction using that entry for address translation. When enhanced DAT applies and the STE format control is zero, bit 55 of the page table entry is the change recording override for the page.

Bit position 52 of the entry must contain zero; otherwise, a translation specification exception is recognized as part of the execution of an instruction using that entry for address translation. Bit positions 56-63 are not assigned and are ignored.

Another Embodiment of the Dynamic Translation

This section describes the translation process as it is performed implicitly before a virtual address is used to access main storage.

Translation of a virtual address is controlled by the DAT mode bit and address space control bits in the program status word and by the ASCEs in control registers 1, 7, and 13 and as specified by the access registers. When the ASCE used in a translation is a region first table designation, the translation is performed by means of a region first table, region second table, region third table, segment table, and page table, all of which reside in real or absolute storage. When the ASCE is a lower level type of table designation (region second table designation, region third table designation, or segment table designation) the translation is performed by means of only the table levels beginning with the designated level, and the virtual address bits that would, if non-zero, require use of a higher level or levels of table must be all zeros; otherwise, an ASCE-type exception is recognized. When the ASCE is a real space designation, the virtual address is treated as a real address, and table entries in real or absolute storage are not used.

The ASCE used for a particular address translation is called the effective ASCE. Accordingly, when a primary virtual address is translated, the contents of control register 1 are used as the effective ASCE. Similarly, for a secondary virtual address, the contents of control register 7 are used; for an AR specified virtual address, the ASCE specified by the access register is used; and for a home virtual address, the contents of control register 13 are used.

When the real space control in the effective ASCE is zero, the designation type in the ASCE specifies the table designation type: region first table, region second table, region third table, or segment table. The corresponding portion of the virtual address (region first index, region second index, region third index, or segment index) is checked against the table length field in the designation, and it is added to the origin in the designation to select an entry in the designated table. If the selected entry is outside its table, as determined by the table length field in the designation, or if the 1 bit is one in the selected entry, a region first translation, region second translation, region third translation, or segment translation exception is recognized, depending on the table level specified by the designation. If the table type bits in the selected entry do not indicate the expected table level, a translation specification exception is recognized.

The table entry selected by means of the effective ASCE designates the next lower level table to be used. If the current table is a region first table, region second table, or region third table, the next portion of the virtual address (region second index, region third index, or segment index, respectively) is checked against the table offset and table length fields in the current table entry, and it is added to the origin in the entry to select an entry in the next lower level table. If the selected entry in the next table is outside its table, as determined by the table offset and table length fields in the current table entry, or if the 1 bit is one in the selected entry, a region second translation, region third translation, or segment translation exception is recognized, depending on the level of the next table. If the table type bits in the selected entry do not indicate the expected table level, a translation specification exception is recognized.

Processing of portions of the virtual address by means of successive table levels continues until a segment table entry has been selected. The segment table entry contains a page protection bit that applies to all pages in the specified segment.

The page index portion of the virtual address is added to the page table origin in the segment table entry to select an entry in the page table. If the 1 bit is one in the page table entry, a page translation exception is recognized. The page table entry contains the leftmost bits of the real address that represents the translation of the virtual address, and it contains a page protection bit that applies only to the page specified by the page table entry.

The byte index field of the virtual address is used unchanged as the rightmost bit positions of the real address.

In order to eliminate the delay associated with references to translation tables in real or absolute storage, the information fetched from the tables normally is also placed in a special buffer, the translation lookaside buffer, and subsequent translations involving the same table entries may be performed by using the information recorded in the translation lookaside buffer. The translation lookaside buffer may also record virtual equals real translations related to a real space designation.

Whenever access to real or absolute storage is made during the address translation process for the purpose of fetching an entry from a region table, segment table, or page table, key controlled protection does not apply.

Lookup in a Table Designated by an ASCE

The DT control, bits 60-61 of the effective ASCE, specifies both the table designation type of the ASCE and the portion of the virtual address that is to be translated by means of the designated table, as follows:

| | Translation by means of Designated Table | |
|---|---|---|
| Bits 60 and 61 | Designation Type | Virtual-Address Portion Translated by the Table |
| 11 | Region-first-table | Region first Index (bits 0-10) |
| 10 | Region-second-table | Region second Index (bits 11-21) |
| 01 | Region-third-table | Region third Index (bits 22-32) |
| 00 | Segment-table | Segment Index (bits 33-43) |

When bits 60 and 61 have the value 11 binary, the region first index portion of the virtual address, in conjunction with the region first table origin contained in the ASCE, is used to select an entry from the region first table. The 64-bit address of the region first table entry in real or absolute storage is obtained by appending 12 zeros to the right of bits 0-51 of the region first table designation and adding the region first index with three rightmost and 50 leftmost zeros appended. As part of the region first table lookup process, bits 0 and 1 of the virtual address (which are bits 0 and 1 of the region first index) are compared against the table length, bits 62 and 63 of the region first table designation, to establish whether the addressed entry is within the region first table. If the value in the table length field is less than the value in the corresponding bit positions of the virtual address, a region first translation exception is recognized. The comparison against the table length may be omitted if the equivalent of a region first table entry in the translation lookaside buffer is used in the translation. The entry fetched from the region first table designates the beginning and specifies the offset and length of the corresponding region second table.

When bits 60 and 61 of the ASCE have the value 10 binary, the region second index portion of the virtual address, in conjunction with the region second table origin contained in the ASCE, is used to select an entry from the region second table. Bits 11 and 12 of the virtual address (which are bits 0 and 1 of the region second index) are compared against the table length in the ASCE. If the value in the table length field is less than the value in the corresponding bit positions of the virtual address, a region second translation exception is recognized. The comparison against the table length may be omitted if the equivalent of a region second table entry in the translation lookaside buffer is used in the translation. The region second table lookup process is otherwise the same as the region first table lookup process; the entry fetched from the region second table designates the beginning and specifies the offset and length of the corresponding region third table.

When bits 60 and 61 of the ASCE have the value 01 binary, the region third index portion of the virtual address, in conjunction with the region third table origin contained in the ASCE, is used to select an entry from the region third table. Bits 22 and 23 of the virtual address (which are bits 0 and 1 of the region third index) are compared against the table length in the ASCE. If the value in the table length field is less than the value in the corresponding bit positions of the virtual address, a region third translation exception is recognized. The region third table lookup process is otherwise the same as the region first table lookup process, including the checking of the table type bits in the region third table entry. The entry fetched from the region third table designates the beginning and specifies the offset and length of the corresponding segment table.

When bits 60 and 61 of the ASCE have the value 00 binary, the segment index portion of the virtual address, in conjunction with the segment table origin contained in the ASCE, is used to select an entry from the segment table. Bits 33 and 34 of the virtual address (which are bits 0 and 1 of the segment index) are compared against the table length in the ASCE. If the value in the table length field is less than the value in the corresponding bit positions of the virtual address, a segment translation exception is recognized. The comparison against the table length may be omitted if the equivalent of a segment table entry in the translation lookaside buffer is used in the translation. The segment table lookup process is otherwise the same as the region first table lookup process, including the checking of the table type bits in the segment table entry. Processing is as follows:

When enhanced DAT does not apply, or when enhanced DAT applies but the STE format control is zero, the entry fetched from the segment table designates the beginning of the corresponding page table, and processing continues as described in "Page Table Lookup", below.

When enhanced DAT applies and the STE format control is one, the entry fetched from the segment table contains the leftmost bits of the segment frame absolute address. If the DAT protection bit is one either in any region table entry used in the translation or in the segment table entry, and the storage reference for which the translation is being performed is a store, a protection exception is recognized.

Lookup in a Table Designated by a Region Table Entry

When the effective ASCE is a region table designation, a region table entry is selected as described in the preceding section. Then the contents of the selected entry and the next index portion of the virtual address are used to select an entry in the next lower level table, which may be another region table or a segment table. When the table entry selected by means of the ASCE is a region first table entry, the region second index portion of the virtual address, in conjunction with the region second table origin contained in the region first table entry, is used to select an entry from the region second table. The 64-bit address of the region second table entry in real or absolute storage is obtained by appending 12 zeros to the right of bits 0-51 of the region first table entry and adding the region second index with three rightmost and 50 leftmost zeros appended.

When forming the address of a region second, region third, or segment table entry, it is unpredictable whether prefixing, if any, is applied to the respective table origin contained in the higher level table entry before the addition of the table index value, or prefixing is applied to the table entry address that is formed by the addition of the table origin and table index value.

As part of the region second table lookup process, bits 11 and 12 of the virtual address (which are bits 0 and 1 of the region second index) are compared against the table offset, bits 56 and 57 of the region first table entry, and against the table length, bits 62 and 63 of the region first table entry, to establish whether the addressed entry is within the region second table. If the value in the table offset field is greater than the value in the corresponding bit positions of the virtual address, or if the value in the table length field is less than the value in the corresponding bit positions of the virtual address, a region second translation exception is recognized.

The region second table designates the beginning and specifies the offset and length of the corresponding region third table.

When the table entry selected by means of the ASCE is a region second table entry, or if a region second table entry has been selected by means of the contents of a region first table entry, the region third index portion of the virtual address, in conjunction with the region third table origin contained in the region second table entry, is used to select an entry from the region third table. Bits 22 and 23 of the virtual address (which are bits 0 and 1 of the region third index) are compared against the table offset and table length in the region second table entry. A region third translation exception is recognized if the table offset is greater than bits 22 and 23 or if the table length is less than bits 22 and 23. The region third table lookup process is otherwise the same as the region second table lookup process. The entry fetched from the region third table designates the beginning and specifies the offset and length of the corresponding segment table.

When the table entry selected by means of the ASCE is a region third table entry, or if a region third table entry has been selected by means of the contents of a region second table entry, the segment index portion of the virtual address, in conjunction with the segment table origin contained in the region third table entry, is used to select an entry from the segment table. Bits 33 and 34 of the virtual address (which are bits 0 and 1 of the segment index) are compared against the table offset and table length in the region third table entry. A segment translation exception is recognized if the table offset is greater than bits 33 and 34 or if the table length is less than bits 33 and 34. A translation specification exception is recognized if (1) the private space control, bit 55, in the ASCE is one and (2) the common segment bit, bit 59, in the entry fetched from the segment table is one. The segment table lookup process is otherwise the same as the region second table lookup process. Processing is as follows:

When enhanced DAT does not apply, or when enhanced DAT applies but the STE format control is zero, the entry fetched from the segment table designates the beginning of the corresponding page table, and processing continues as described in "Page Table Lookup", below.

When enhanced DAT applies and the STE format control is one, the entry fetched from the segment table contains the leftmost bits of the segment frame absolute address. If the DAT protection bit is one either in any region table entry used in the translation or in the segment table entry, and the storage reference for which the translation is being performed is a store, a protection exception is recognized.

Page Table Lookup

When enhanced DAT does not apply, or when enhanced DAT applies but the STE format control is zero, the page index portion of the virtual address, in conjunction with the page table origin contained in the segment table entry, is used to select an entry from the page table.

The 64-bit address of the page table entry in real or absolute storage is obtained by appending 11 zeros to the right of the page table origin and adding the page index, with three rightmost and 53 leftmost zeros appended. A carry out of bit position 0 cannot occur.

The entry fetched from the page table indicates the availability of the page and contains the leftmost bits of the page frame real address. The page invalid bit, bit 53, is inspected to establish whether the corresponding page is available. If this bit is one, a page translation exception is recognized. If bit position 52 contains a one, a translation specification exception is recognized. When enhanced DAT does not apply, or enhanced DAT applies and the STE format control is zero, a translation specification exception is also recognized if bit position 55 contains a one. If the DAT protection bit is one either in the segment table entry used in the translation, in the page table entry, or, when enhanced DAT applies, in any region table entry used during the translation, and the storage reference for which the translation is being performed is a store, a protection exception is recognized.

Formation of the Real and Absolute Addresses

When the effective ASCE is a real space designation, bits 0-63 of the virtual address are used directly as the real storage address. The real address may be further subjected to prefixing to form an absolute address. When the effective ASCE is not a real space designation and no exceptions in the translation process are encountered, the following conditions apply:

When the enhanced DAT does not apply, or when enhanced DAT applies but the STE format control is zero, the page frame real address is obtained from the page table entry. The page frame real address and the byte index portion of the virtual address are concatenated, with the page frame real address forming the leftmost part. The result is the real storage address which corresponds to the virtual address. The real address may be further subjected to prefixing to form an absolute address.

When enhanced DAT applies and the STE format control is one, the segment frame absolute address and the page index and byte index portions of the virtual address are concatenated, left to right, respectively, to form the absolute address which corresponds to the virtual address.

Recognition of Exceptions During Translation

Invalid addresses and invalid formats can cause exceptions to be recognized during the translation process. Exceptions are recognized when information contained in table entries is used for translation and is found to be incorrect.

Figure 6:
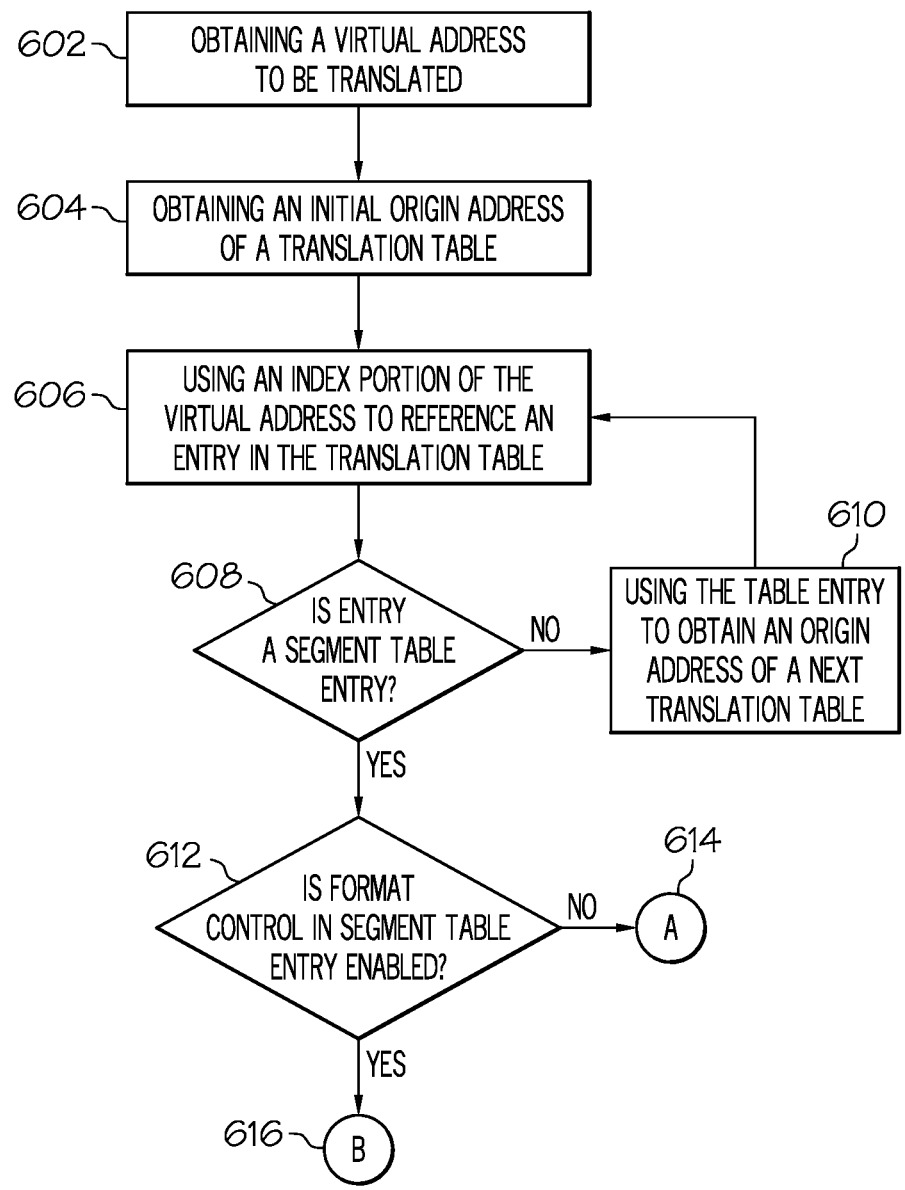
FIG. 6 illustrates a flow diagram of one embodiment of enhanced dynamic address translation (eDAT) to obtain a format control field in a segment table entry.

Reference is now being made to FIG. 6 which illustrates a flow diagram of one embodiment of dynamic address translation to the point of obtaining a format control field from a segment table entry.

At 602, a virtual address to be translated is obtained. At 604, the origin address of the highest translation table used in translation of the virtual address is obtained. The origin address of the first translation table used in translation depends on the ASCE and the DT bits. At 606, a portion of the virtual address is used to reference the appropriate table entry in the translation table. If, at 608, the entry fetched from the translation table is not a segment table entry then the segment table in the hierarchy of translation tables has not yet been referenced. In this case, at 610, the origin of a next lower table in the hierarchy of translation tables is obtained from the table entry. The appropriate portion of the virtual address is used to reference the corresponding table entry in the next lower table used in translation.

For example, if the table origin address of the first translation table to be used in translation is a region first table then the RFX portion of the virtual address is used to reference a region first table entry with the region first table. If the table origin address is to a region second table then the RSX portion of the virtual address is used to reference a region second table entry within the region second table. If the table origin address is to a region third table then the RTX portion of the virtual address is used to reference a region third table entry within the region third table. If the table origin address is to a segment table then the SX portion of the virtual address is used to reference a segment table entry within the segment table. Successive tables are referenced until the segment table entry has been fetched.

Once the segment table entry has been fetched, the segment table entry (STE) format control bit is examined, at 612, to determine if format control is enabled for this particular virtual address. If the STE format control is zero then dynamic address translation occurs with respect to node 614. If the STE format control is one then dynamic address translation occurs with respect to node 616.

Dynamic Address Translation (STE Format Control is Zero)

Figure 7:
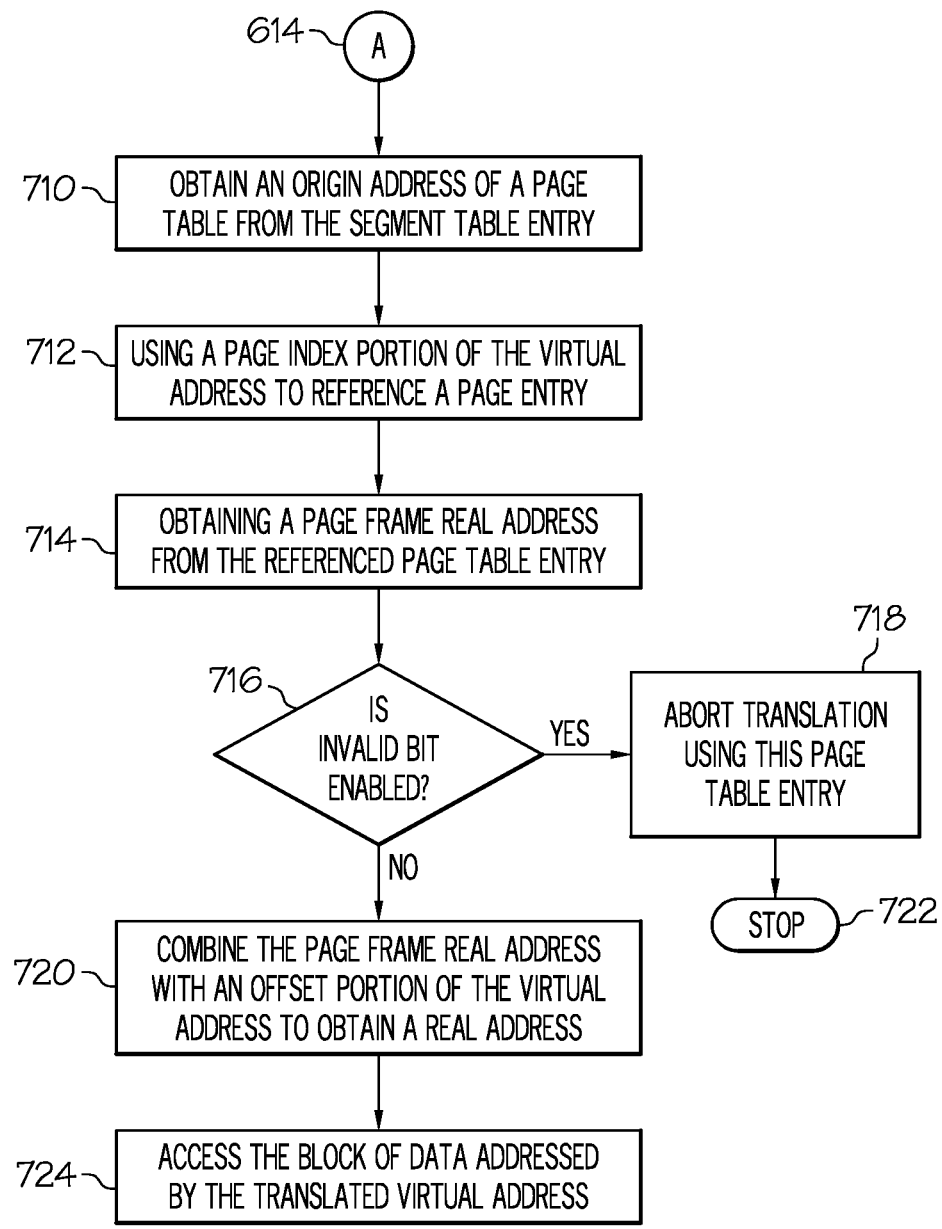
FIG. 7 illustrates a continuation of the flow diagram from node 614 of FIG. 6.

Reference is now being made to FIG. 7 which illustrates a continuation of the flow diagram from node 614 of FIG. 6 when the STE format control is zero.

At 710, an origin address to a page table is obtained from the segment table entry. At 712, a PX portion of the virtual address is used to reference a page table entry in the page table. At 714, a page frame real address (PFRA) is obtained from the page table entry. An Invalid (I) bit is obtained from the page table entry. If, at 716, the Invalid (I) bit is one then, at 718, translation of the virtual address cannot continue using this page table entry because the entry has been marked as being invalid. Further translation of the virtual address using this page table entry stops 722. If, at 716, the Invalid (I) bit is zero then, at 720, the page frame real address (PFRA) is combined with a BX portion of the virtual address to generate a real address. The real address may be further subject to a prefixing operation to form an absolute address. At 724, the real address is used to access a block of data addressed by the translated virtual address.

Dynamic Address Translation (STE Format Control is One)

Figure 8:
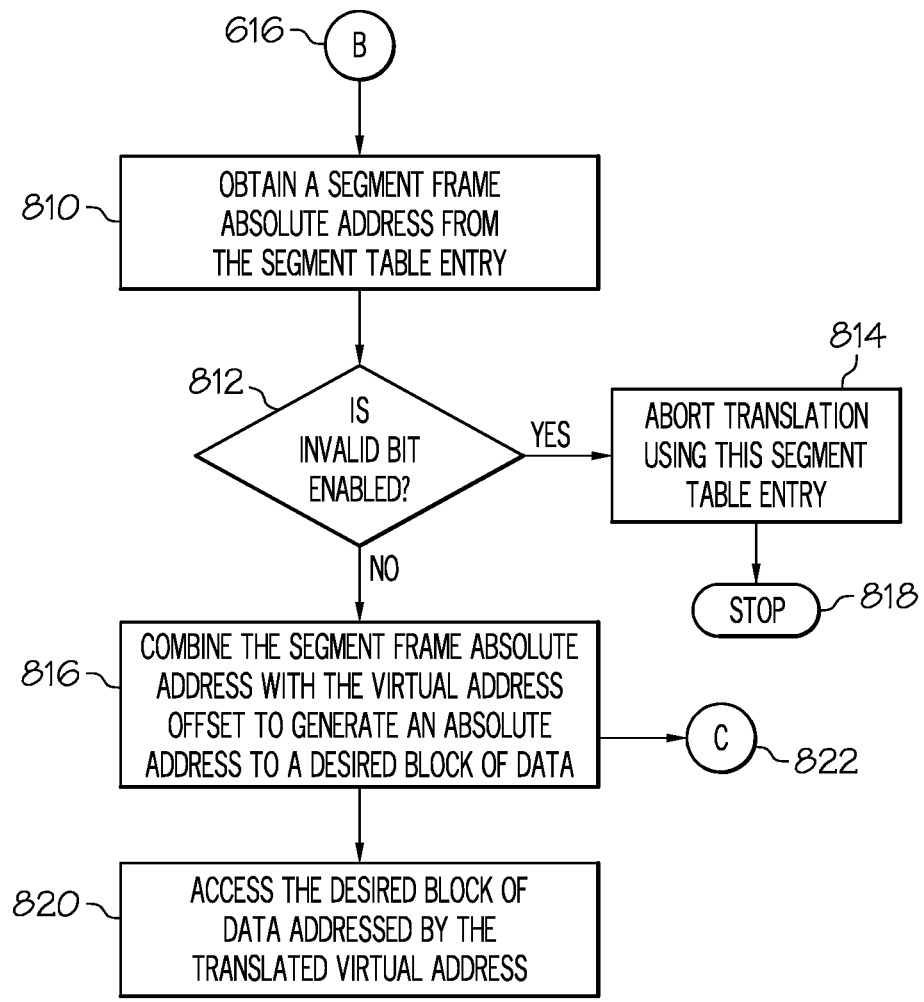
FIG. 8 illustrates a continuation of the flow diagram from node 616 of FIG. 6.

Reference is now being made to FIG. 8 which illustrates a continuation of the flow diagram from node 616 of FIG. 6.

At 810, a segment frame absolute address (SFAA) is obtained from a portion of the segment table entry. An invalid (I) bit is obtained from the segment table entry. If, at 812, the invalid (I) bit is one then, at 814, further translation of the virtual address cannot proceed using the segment table entry because it has been marked as being invalid. In one embodiment, an exception code is returned to the program entity requesting translation. Further translation of this virtual address using this segment table entry stops 818.

If, at 812, the invalid (I) bit is zero then, at 816, the segment frame absolute address (SFAA) is combined with PX and BX portion of the virtual address to generate an absolute address to a desired large block of data in main storage or in memory. At 820, the desired large block of data addressed by the translated virtual address is accessed.

At each table entry, the invalid bit is examined to determine the validity of the table entry obtained. Other translation protection mechanisms which protect the block of data addressed by the translated virtual address are discussed herein further.

In another embodiment, restricting information is obtained from the translation table entry. The restricting information is used for restricting the access to a restricted portion of the virtual address range. The access to the desired large block of data addressed by the translated address is thereafter permitted to only the restricted portion of the address range. The restricting information is any one of a table offset or a table length.

In yet another embodiment, information used in the translation of the virtual address is stored in at least one translation lookaside buffer. A subsequent translation of a subsequent virtual address into an absolute address of the block of data in main storage is performed using the stored information from the translation lookaside buffer rather than the hierarchy of translation tables.

In yet another embodiment, if the translation is not native to the machine architecture, a predetermined software routine is identified for emulating the translation. The predetermined software routine contains a plurality of instructions. The predetermined software routine is executed.

Protection of the Addressed Data Block

Once the virtual address has been translated using the enhanced DAT facility, as described herein, the desired block of data in main storage or memory addressed by the translated virtual address may be subjected to additional protection mechanism.

DAT Protection

The DAT protection function controls access to virtual storage by using the DAT protection bit in each page table entry and segment table entry, and, when the enhanced DAT facility is installed, in each region table entry. It provides protection against improper storing.

The DAT protection bit (bit 54) of the page table entry controls whether storing is allowed into the corresponding 4 Kilobyte page. When the bit is zero, both fetching and storing are permitted; when the bit is one, only fetching is permitted. When an attempt is made to store into a protected page, the contents of the page remain unchanged, the unit of operation or the execution of the instruction is suppressed, and a program interruption for protection takes place.

The DAT protection bit (bit 54) of the segment table entry controls whether storing is allowed into the corresponding 1 Megabyte segment, as follows:

When enhanced DAT does not apply, or when enhanced DAT applies and the STE format control is zero, the DAT protection bit of the segment table entry is treated as being OR'ed into the DAT protection bit position of each entry in the page table designated by the segment table entry. Thus, when the segment table entry DAT protection bit is one, the effect is as if the DAT protection bit were one in each entry in the designated page table.

When enhanced DAT applies and the STE format control is one, the DAT protection bit of the segment table entry controls whether storing is allowed into the corresponding 1 Megabyte segment. When the bit is zero, both fetching and storing are permitted; when the bit is one, only fetching is permitted. When an attempt is made to store into a protected segment, the contents of the segment remain unchanged, the unit of operation or the execution of the instruction is suppressed, and a program interruption for protection takes place.

When enhanced DAT applies, the DAT protection bit of the region table entry, controls whether storing is allowed into the corresponding region(s). The DAT protection bit in a region table entry is treated as being OR'ed into the DAT protection bit position of any subsequent region table entry and segment table entry that is used in the translation. When the STE format control bit is zero, the DAT protection bit is further propagated to the page table entry.

DAT protection applies to all store-type references that use a virtual address.

Figure 9:
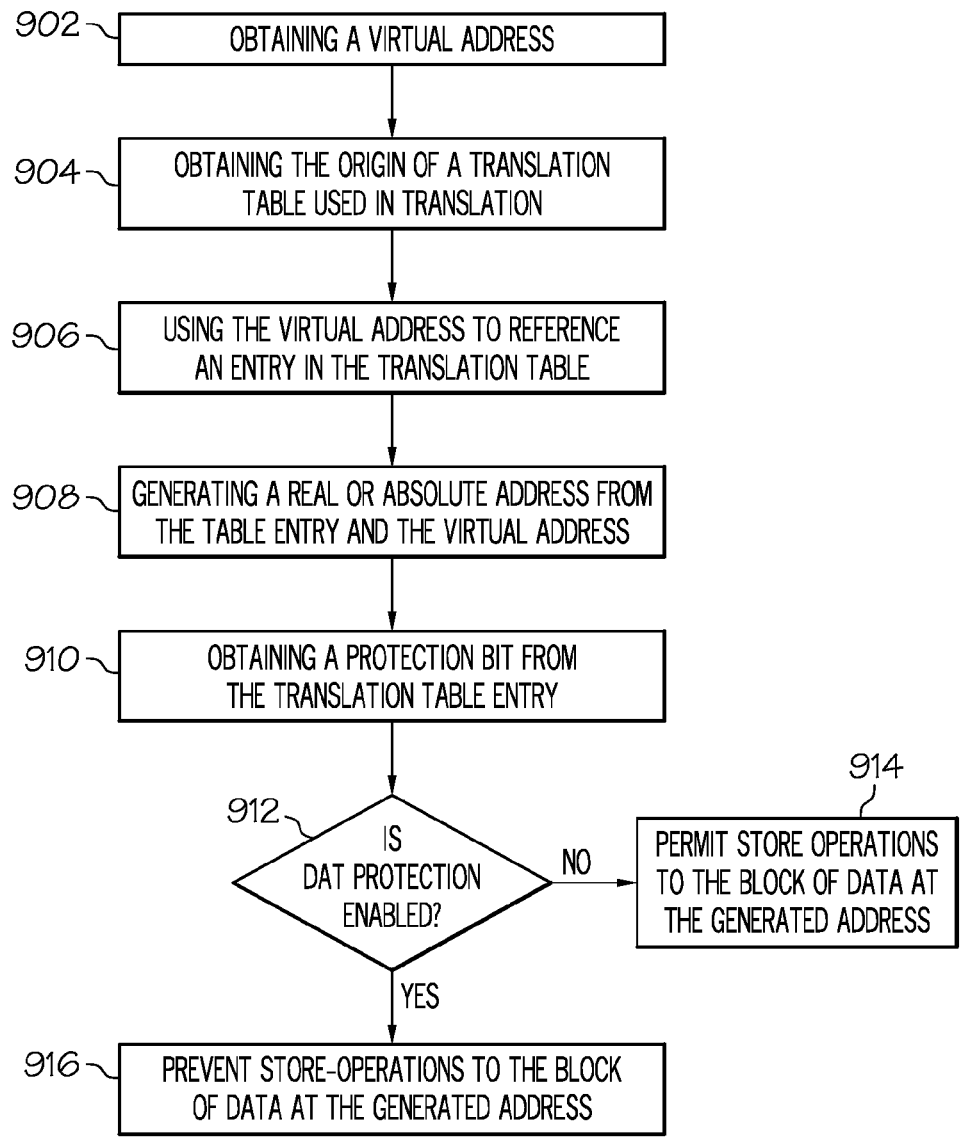
FIG. 9 illustrates a flow diagram of one embodiment of determining the level of DAT protection to be applied to a desired block of data addressed by the translated virtual address.

Reference is now being made to FIG. 9 which illustrates a flow diagram of one embodiment of obtaining the DAT protection bit from the segment table entry used in translation.

At 902, a virtual address to be translated is obtained. At 904, the origin of a first translation table used in translation of the virtual address is obtained. At 906, a portion of the virtual address is used to reference an entry in a translation table in a manner previously discussed. At 908, a real or absolute address is generated from either the obtained segment frame absolute address (SFAA) or the page frame real address (PFRA).

At 910, a DAT protection (P) bit is obtained from each entry of the translation tables used in translation of the virtual address. It should be understood that the effective level of DAT protection is the logical OR of multiple P bits obtained from each of the table entries used in translation. At 912, the DAT protection bit is examined to determine whether the block of data addressed by the translated virtual address is DAT protected. If, at 912, the DAT protection (P) bit is zero then, at 914, store operations are permitted to the block of data addressed by the translated virtual address. If, at 912, the DAT protection (P) bit is one then, at 916, store operations are prevented to the block of data addressed by the translated virtual address. Alternatively, a level of protection indicated by the DAT protection field is applied to all store-type references that use the virtual address. If the DAT protection field is enabled then a protection exception condition is indicated if a store is attempted to the desired block of data addressed by the translated virtual address.

Key Controlled Protection

When key controlled protection applies to a storage access, a store is permitted only when the storage key matches the access key associated with the request for storage access; a fetch is permitted when the keys match or when the fetch protection bit of the storage key is zero. The keys are said to match when the four access control bits of the storage key are equal to the access key, or when the access key is zero. The protection action is summarized as follows.

| Conditions | | Is Access to | |
| --- | --- | --- | --- |
| Fetch-Protection | | Storage Permitted | |
| Bit of Storage Key | Key Relation | Fetch | Store |
| 0 | Match | Yes | Yes |
| 0 | Mismatch | Yes | No |
| 1 | Match | Yes | Yes |
| 1 | Mismatch | No | No |

-continued

Explanation:
Match    The four access-control bits of the storage key are equal to the access key, or the access key is zero.
Yes    Access is permitted.
No    Access is not permitted. On fetching, the information is not made available to the program; on storing, the contents of the storage location are not changed.

Storage-Protection-Override Control

In one example, Bit 39 of control register 0 is the storage-protection-override control. When this bit is one, storage-protection override is active. When this bit is zero, storage-protection override is inactive. When storage-protection override is active, key-controlled storage protection is ignored for storage locations having an associated storage-key value of, for example, 9. When storage-protection override is inactive, no special action is taken for a storage-key value of 9.

Storage-protection override applies to instruction fetch and to the fetch and store accesses of instructions whose operand addresses are logical, virtual, or real. It does not apply to accesses made for the purpose of channel-program execution or for the purpose of channel-subsystem monitoring.

Storage-protection override has no effect on accesses which are not subject to key-controlled protection.

Summary of Protective Action

When the access to storage is initiated by the CPU and key controlled protection applies, the PSW Key is the access key, except that the access key is specified in a general register for the first operand of MOVE TO SECONDARY and MOVE WITH DESTINATION KEY, for the second operand of MOVE TO PRIMARY, MOVE WITH KEY, and MOVE WITH SOURCE KEY, and for either the first or the second operand of MOVE PAGE. The PSW Key occupies bit positions 8-11 of the current program status word.

When a CPU access is prohibited because of key controlled protection, the execution of the instruction is terminated, and a program interruption for a protection exception takes place. However, the unit of operation or the execution of the instruction may be suppressed.

Storage Keys

Figure 31:
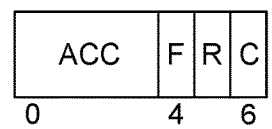
FIG. 31 is a diagram of a format of storage key entry.

A storage key is associated with each 4 Kilobyte block of storage that is available in the configuration. Storage keys are not part of addressable storage. In one embodiment, the storage key has the format shown in FIG. 31.

Storage Key Format

The bit positions in the storage key are allocated as follows:

Access Control Bits (ACC):

If a reference is subject to key controlled protection, the four access control bits are matched with the four-bit access key when information is stored and when information is fetched from a location that is protected against fetching.

Fetch Protection Bit (F):

If a reference is subject to key controlled protection, the fetch protection bit controls whether key controlled protection applies to fetch-type references: a zero indicates that only store-type references are monitored and that fetching with any access key is permitted; a one indicates that key controlled protection applies to both fetching and storing.

Reference Bit (R):

The reference bit normally is set to one each time a location in the corresponding storage block is referred to either for storing or for fetching of information.

Change Bit (C):

The change bit is set to one each time information is stored at a location in the corresponding storage block.

When enhanced DAT applies, the following additional conditions are in effect:

When the STE format control (FC, bit 53 of the segment table entry used during a translation) is zero, bit 55 of the page table entry used during translation is the change recording override (CO) for the page. When the CO bit in the page table entry is one, change recording is unpredictable for any store operations to the page.

When the format control bit (FC) in the segment table entry is one, the following applies:

Bit position 47 of the segment table entry contains the ACCF validity control. The ACCF validity control determines the validity of the access control and fetch protection bits in the STE. When the ACCF validity control is zero, key controlled protection uses the access control and fetch protection bits in the storage key for the 4K byte block corresponding to the address.

When the ACCF validity control is one, bit positions 48-52 of the segment table entry contain the access control bits and the fetch protection bit for the segment. When determining accessibility to a storage operand, it is unpredictable whether bits 48-52 of the STE or bits 0-4 of the individual storage keys for the 4K byte blocks composing the segment are examined.

Bit 55 of the segment table entry is the change recording override (CO) for the segment. When the CO bit in the segment table entry is one, it is unpredictable whether the change bit is set for any store operations to the segment.

Storage Key Accesses

References to the storage key are handled as follows:

Whenever a reference to storage is made and key controlled protection applies to the reference, the four access control bits and the fetch protection bit associated with the storage location are inspected concurrently and concurrently with the reference to the storage location. When (1) enhanced DAT does not apply, (2) enhanced DAT applies but the storage is accessed by means of a segment table entry in which the STE format control is zero, or (3) enhanced DAT applies, the storage is accessed by means of a segment table entry in which the STE format control is one, but the ACCF validity control is zero, the access control bits and the fetch protection bit are in bits 0-4 of the storage key for the 4K byte block. When enhanced DAT applies and the storage is accessed by means of a segment table entry in which both the STE format control and ACCF validity control are one, it is unpredictable whether bits 0-4 of the storage key or bits 48-52 of the segment table entry provide the access control bits and fetch protection bit. Furthermore, when the segment table entry provides the access control bits and fetch protection bit, a buffered copy from the translation lookaside buffer may be used.

When enhanced DAT applies, and either (a) the STE format control is zero, and the change recording override is one in the page table entry used by DAT, or (b) the STE format control is one, and the change recording override is one in the segment table entry used by DAT, it is unpredictable whether the CPU sets the change bit when performing a store operation. The change recording override may be buffered in the translation lookaside buffer copy of the PTE or STE.

When the conditional SSKE feature is not installed, the SET STORAGE KEY EXTENDED instruction causes all seven bits to be set concurrently in the storage key. When the conditional SSKE feature is installed, the SET STORAGE KEY EXTENDED instruction may be used to set all or portions of the storage key based on program specified criteria.

The INSERT STORAGE KEY EXTENDED instruction provides a consistent image of bits 0-6 of the storage key for a 4K byte block. Similarly, the instructions INSERT VIRTUAL STORAGE KEY and TEST PROTECTION provide a consistent image of the access control bits and the fetch protection bit.

The instruction RESET REFERENCE BIT EXTENDED modifies only the reference bit. All other bits of the storage key remain unchanged. The reference bit and change bit are examined concurrently to set the condition code.

The record of references provided by the reference bit is not necessarily accurate. However, in the majority of situations, reference recording approximately coincides with the related storage reference. The change bit may be set in cases when no storing has occurred.

As observed by other CPUs, storage key fetches and stores due to instructions that explicitly manipulate a storage key (INSERT STORAGE KEY EXTENDED, INSERT VIRTUAL STORAGE KEY, RESET REFERENCE BIT EXTENDED, and SET STORAGE KEY EXTENDED) are ordered among themselves and among storage operand references as if the storage key accesses were themselves storage operand fetches and stores, respectively.

Access Control and Fetch Protection (ACC/F)

A block of data in main storage or memory can be further protected by way of access control and fetch protection bits provided in the segment table entry.

Access Validity (AV) and Access Control (ACC)

Figure 10:
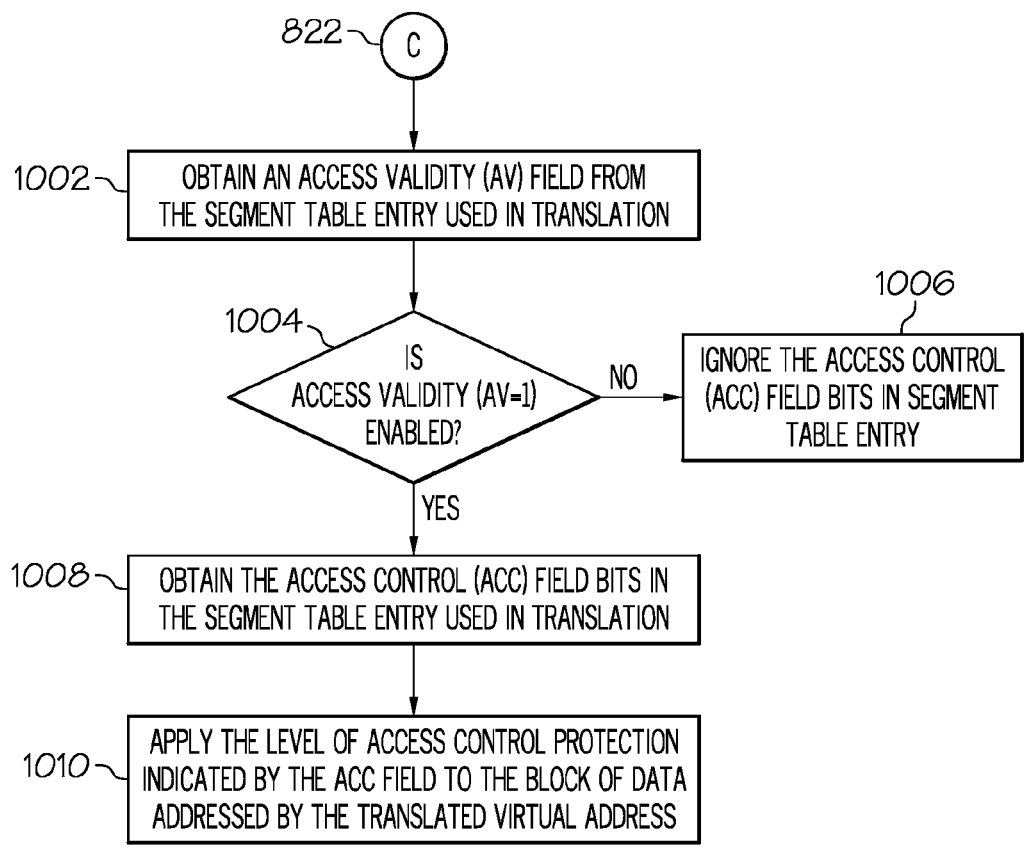
FIG. 10 illustrates a continuation of the flow diagram from node 822 of FIG. 8 determining the level of access control protection to be applied to a desired block of data addressed by the translated virtual address.

Reference is now being made to FIG. 10 which illustrates one embodiment of a flow diagram of determining the access control protection to be applied to a desired block of data addressed by the translated virtual address.

Dynamic address translation proceeds to the point wherein a segment table entry has been fetched from a segment table used in translation as described in FIG. 6 to node 616. Address translation continues as described in FIG. 8 to node 822 wherein an absolute address to a desired block of data in storage or memory has been obtained. The flow of FIG. 10 begins at node 822.

At 1002, an access validity (AV) field is obtained from the segment table entry. At 1004, a determination is made whether the access validity field in the segment table entry is enabled (AV=1). If the access validity field is zero then the access control (ACC) field in the segment table entry is not valid. At 1006, the bits of the access control field are ignored. If the access validity field is enabled, then the access control field is valid. At 1008, the bits of the access control field are obtained from the segment table entry. At 1010, the level of access control protection indicated by the ACC field in the segment table entry is applied to the desired block of data addressed by the translated virtual address.

In another embodiment, store operations to the desired block of data are permitted only if the access control field matches an access key provided by a program entity such as a Program Status Word or an operand of a program instruction being executed. A protection exception is preferably indicated if a store is attempted at the desired block of data and the access control field does not match the access key.

In yet another embodiment, if the access validity field is enabled, a protection exception is indicated if a fetch operation or a store operation is attempted at the desired block of memory and the segment access control field does not match the program access control field.

Access Validity (AV) and Fetch Protection (F)

Figure 11:
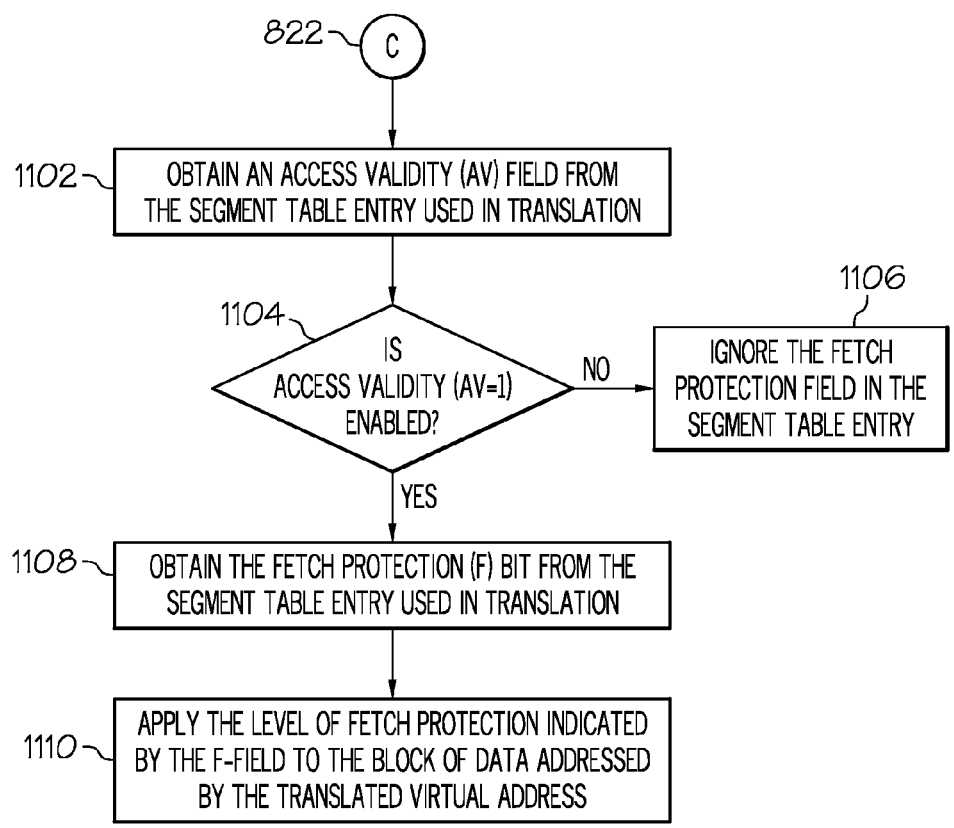
FIG. 11 illustrates a continuation of the flow diagram from node 822 of FIG. 8 determining the level of fetch protection to be applied to a desired block of data addressed by the translated virtual address.

Reference is now being made to FIG. 11 which illustrates one embodiment of a flow diagram of determining the fetch protection to be applied to a desired block of data addressed by the translated virtual address.

Dynamic address translation proceeds to the point wherein a segment table entry has been fetched from a segment table used in translation as described in FIG. 6 to node 616. Address translation continues as described in FIG. 8 to node 822 wherein an absolute address to a desired block of data in storage or memory has been obtained. The flow of FIG. 11 begins at node 822.

At 1102, an access validity (AV) field is obtained from the segment table entry. At 1104, a determination is made whether the access validity field in the segment table entry is enabled (AV=1). If, at 1104, the access validity field is zero then, at 1106, the fetch protection bit is ignored. If, at 1104, the access validity field is enabled then, at 1108, the fetch protection bit is obtained from the segment table entry. At 1110, the level of fetch protection indicated by the F field in the segment table entry is applied to the desired block of data addressed by the translated virtual address. Fetch operations from the block of data addressed by the translated virtual address are permitted only if the fetch protection field matches an access key. The access key is provided by a Program Status Word or an operand of a program instruction being executed. Fetch operations from the desired block of data are permitted only if either the fetch protection field is disabled or if both the fetch protection field is enabled and the access control field associated with the virtual address is equal to the access key. If the access key is zero, fetches from the desired block of data are permitted.

In yet another embodiment, if the program access key is zero, store operations to the desired block of memory and fetch operations from the desired block of memory are permitted.

In yet another embodiment, if the access validity field and the fetch protection field are enabled, a protection exception is indicated in response to a fetch operation being attempted from the desired block of memory and the segment access control field not matching the program access control field.

Set Storage Key Extended (SSKE)

Figure 32:
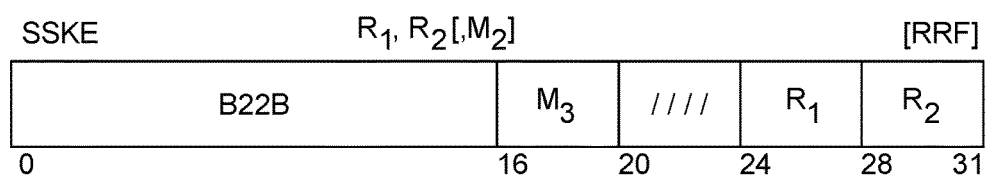
FIG. 32 is a diagram of a format of SSKE instruction.

Storage keys can be set by means of a SET STORAGE KEY EXTENDED (SSKE) instruction. In one embodiment, the SSKE instruction has the format shown in FIG. 32.

The storage key for one or more 4K byte blocks is replaced by the value in the first operand register. When the conditional SSKE facility is installed, certain functions of the key setting operation may be bypassed. When the conditional SSKE facility is not installed, or when the conditional SSKE facility is installed and both the MR and MC bits of the M3 field are zero, the storage key for the 4K byte block that is addressed by the contents of general register R2 is replaced by bits from general register R1. The instruction completes without changing the condition code.

When the conditional SSKE facility is installed and either or both of the MR and MC bits are one, the access control bits, fetch protection bit, and, optionally, the reference bit and change bit of the storage key that is addressed by the contents of general register R2 are compared with corresponding bits in general register R1. If the compared bits are equal, then no change is made to the key; otherwise, selected bits of the key are replaced by the corresponding bits in general register R1. The storage key prior to any modification is inserted in general register R1, and the result is indicated by the condition code.

Figure 33:
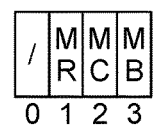
FIG. 33 is a diagram of a format of M3 field.

When the enhanced DAT facility is installed, the above operations may be repeated for the storage keys of multiple 4K byte blocks within the same 1 MB block, subject to the control of the multiple block control, described below. In one embodiment, the M3 field has the format shown in FIG. 33.

The bits of the M3 field are defined as follows:
Reserved:
Bit 0 is reserved.
Reference Bit Update Mask (MR):
The MR bit, bit 1 of the M3 field, controls whether updates to the reference bit in the storage key may be bypassed, as described below.
Change Bit Update Mask (MC):
The MC bit, bit 2 of the M3 field, controls whether updates to the change bit in the storage key may be bypassed, as described below.
Multiple Block Control (MB):
The MB bit, bit 3 of the M3 field, controls whether the storage keys for multiple 4K byte blocks of storage may be set, as described in Setting Storage Keys in Multiple 4K Byte Blocks.

When the enhanced DAT facility is not installed, bit position 3 of the M3 field is reserved. When the conditional SSKE facility is installed, processing is as follows:

When both the MR and MC bits, bits 1 and 2 of the M3 field, are zero, the instruction completes as though the conditional SSKE facility was not installed. The storage key for the 4K byte block that is addressed by the contents of general register R2 is replaced by bits from general register R1, and the instruction completes without changing the condition code.

When either or both the MR and MC bits are one, processing is as follows:

Prior to any modification, the contents of the storage key for the 4K byte block that is addressed by general register R2 are placed in bit positions 48-54 of general register R1, and bit 55 of general register R1 is set to zero. Bits 0-47 and 56-63 of the register remain unchanged. If an invalid checking block code (CBC) is detected when fetching the storage key, then (a) the entire storage key for the 4K byte block is replaced by bits 56-62 of general register R1, (b) the contents of bit positions 48-55 of general register R1 are unpredictable, and (c) the instruction completes by setting condition code 3.

The access control bits and fetch protection bit of the storage key for the designated 4K byte block are compared with the corresponding fields in bits 56-60 of general register R1. If the respective fields are not equal, the entire storage key for the 4K byte block is replaced by bits from general register R1, and the instruction completes by setting condition code 1. When the access control and fetch protection bits in the storage key are equal to the respective bits in general register R1, processing continues as described below.

When both the MR and MC bits are one, the instruction completes by setting condition code 0. The storage key remains unchanged in this case.

When the MR bit is zero and the MC bit is one, then the reference bit of the storage key for the designated 4K byte block is compared with bit 61 of general register R1. If the bits are equal, the instruction completes by setting condition code 0. The storage key remains unchanged in this case. If the bits are not equal, then either (a) the entire storage key for the designated 4K byte block is replaced by the bits in general register R1, and the instruction completes by setting condition code 1; or (b) the reference bit for the storage key is replaced by bit 61 of general register R1, the change bit for the key is unpredictable, and the instruction completes by setting condition code 2. It is unpredictable whether condition code 1 or 2 is set.

When the MC bit is zero and the MR bit is one, then the change bit of the storage key for the designated 4K byte block is compared with bit 62 of general register R1. If the bits are equal, the instruction completes by setting condition code 0. The storage key remains unchanged in this case. If the bits are not equal, then either (a) the entire storage key for the designated 4K byte block is replaced by the bits in general register R1, and the instruction completes by setting condition code 1; or (b) the change bit for the storage key is replaced by bit 62 of general register R1, the reference bit for the key is unpredictable, and the instruction completes by setting condition code 2. It is unpredictable whether condition code 1 or 2 is set.

When the enhanced DAT facility is not installed, or when the facility is installed but the multiple block control is zero, general register R2 contains a real address. When the enhanced DAT facility is installed and the multiple block control is one, general register R2 contains an absolute address. In the 24-bit addressing mode, bits 40-51 of general register R2 designate a 4K byte block in real or absolute storage, and bits 0-39 and 52-63 of the register are ignored. In the 31-bit addressing mode, bits 33-51 of general register R2 designate a 4K byte block in real or absolute storage, and bits 0-32 and 52-63 of the register are ignored. In the 64-bit addressing mode, bits 0-51 of general register R2 designate a 4K byte block in real or absolute storage, and bits 52-63 of the register are ignored. Because it is a real or absolute address, the address designating the storage block is not subject to dynamic address translation. The reference to the storage key is not subject to a protection exception.

The new seven bit storage key value, or selected bits thereof, is obtained from bit positions 56-62 of general register R1. The contents of bit positions 0-55 and 63 of the register are ignored. When the conditional SSKE facility is installed, and either or both the MR and MC bits are one, bit position 63 should contain a zero; otherwise, the program may not operate compatibly in the future.

A serialization and checkpoint synchronization function is performed before the operation begins and again after the operation is completed, except that when the conditional SSKE facility is installed and the resulting condition code is 0, it is unpredictable whether a serialization and checkpoint synchronization function is performed after the operation completes. For any store access, by any CPU or channel program, completed to the designated 4K byte block either before or after the setting of the key by this instruction, the associated setting of the reference and change bits to one in the storage key for the block also is completed before or after, respectively, the execution of this instruction.

Setting Storage Keys in Multiple 4K Byte Blocks

When the enhanced DAT facility is not installed, or when the facility is installed, but the multiple block control is zero, the storage key for a single 4K byte block is set, as described above. When the enhanced DAT facility is installed, and the multiple block control is one, the storage keys for multiple 4K byte blocks within a 1 Megabyte block may be set, beginning with the block specified by the second operand address, and continuing to the right with each successive block up to the next 1 Megabyte boundary. In this case, SET STORAGE KEY EXTENDED is interruptible, and processing is as follows:

When an interruption occurs (other than one that follows termination), general register R2 has been updated so the instruction, when re-executed, resumes at the point of interruption. If either or both the MR or MC bits are one, the condition code is unpredictable; otherwise, the condition code is unchanged.

When the instruction completes without interruption, general register R2 has been updated to the next 1 Megabyte boundary. If either or both the MR or MC bits are one, condition code 3 is set; otherwise, the condition code is unchanged.

In either of the above two cases, when either or both the MR or MC bits are one, bits 48-55 of general register R1 are unpredictable.

When multiple block processing occurs and the R1 and R2 fields designate the same register, the second operand address is placed in the register. When multiple block processing occurs in the 24-bit or 31-bit addressing modes, the leftmost bits which are not part of the address in bit positions 32-63 of general register R2 are set to zeros; bits 0-31 of the register are unchanged.

Resulting Condition Code:

When the conditional SSKE facility is not installed, or when both the MR and MC bits of the M3 field are zero, the condition code remains unchanged. When the conditional SSKE facility is installed, and either or both of the MR and MC bits are one, the condition code is set as follows:

0—Storage key not set
1—Entire storage key set
2—Partial storage key set
3—Entire storage key set; bits 48-55 of general register R1 are unpredictable.

Program Exceptions:

Addressing (address specified by general register R2)
Privileged operation
Change Recording Change recording provides information as to which pages have to be saved in auxiliary storage when they are replaced in main storage. Change recording uses the change bit, (bit 6), of the storage key. The change bit is set to one each time a store access causes the contents of the corresponding storage block to be changed, and either (a) enhanced DAT does not apply, or (b) enhanced DAT applies, and either of the following is true:

The STE format control in the segment table entry used by DAT is zero, and the change recording override (CO) in the page table entry used by DAT is zero.

The STE format control in the segment table entry used by DAT is one, and the change recording override (CO) in the segment table entry used by DAT is zero.

A store access that does not change the contents of storage may or may not set the change bit to one. The change bit is not set to one for an attempt to store if the access is prohibited. In particular:

For the CPU, a store access is prohibited whenever an access exception exists for that access, or whenever an exception exists which is of higher priority than the priority of an access exception for that access.

For the channel subsystem, a store access is prohibited whenever a key controlled protection violation exists for that access.

Change recording is always active and takes place for all store accesses to storage, including those made by any CPU (except when suppressed by the change recording override, described herein), any operator facility, or the channel subsystem. It takes place for implicit references made by the machine, such as those which are part of interruptions.

Change recording does not take place for the operands of the following instructions since they directly modify a storage key without modifying a storage location:

Reset Reference Bit Extended
SET STORAGE KEY EXTENDED (change bit is set to a specified value).

Change bits which have been changed from zeros to ones are not necessarily restored to zeros on CPU retry.

Change Recording Override (CO)

The storage key's change bit is set to one each time a store access causes the contents of the corresponding storage block to be changed. A store access that does not change the contents of storage may or may not set the change bit to one. The change bit is not set to one on an attempt to store if the access is prohibited. Change recording override allows the setting of the storage key's change bit to be bypassed.

When enhanced DAT applies, and the virtual address is translated by means of DAT table entries, a change recording override (CO) is provided in bit 55 of both the segment table entry and the page table entry. When the STE format control (FC) bit 53 of the segment table entry is zero, the change recording override in the page table entry applies. When the change recording override in the PTE is zero, change recording occurs for store operations to the 4K byte block. When the change recording override is one, it is unpredictable whether change recording occurs for store operations to the 4K byte block. When the STE format control is one, the change recording override in the STE applies. When the change recording override in the STE is zero, change recording occurs for store operations to any of the segment's 256 4K byte blocks. When the change recording override in the STE is one, it is unpredictable whether change recording occurs to any of the segment's 256 4K byte blocks.

The change recording override does not apply to real or absolute addresses, or to a virtual address that is translated by means of a real space designation.

Figure 12:
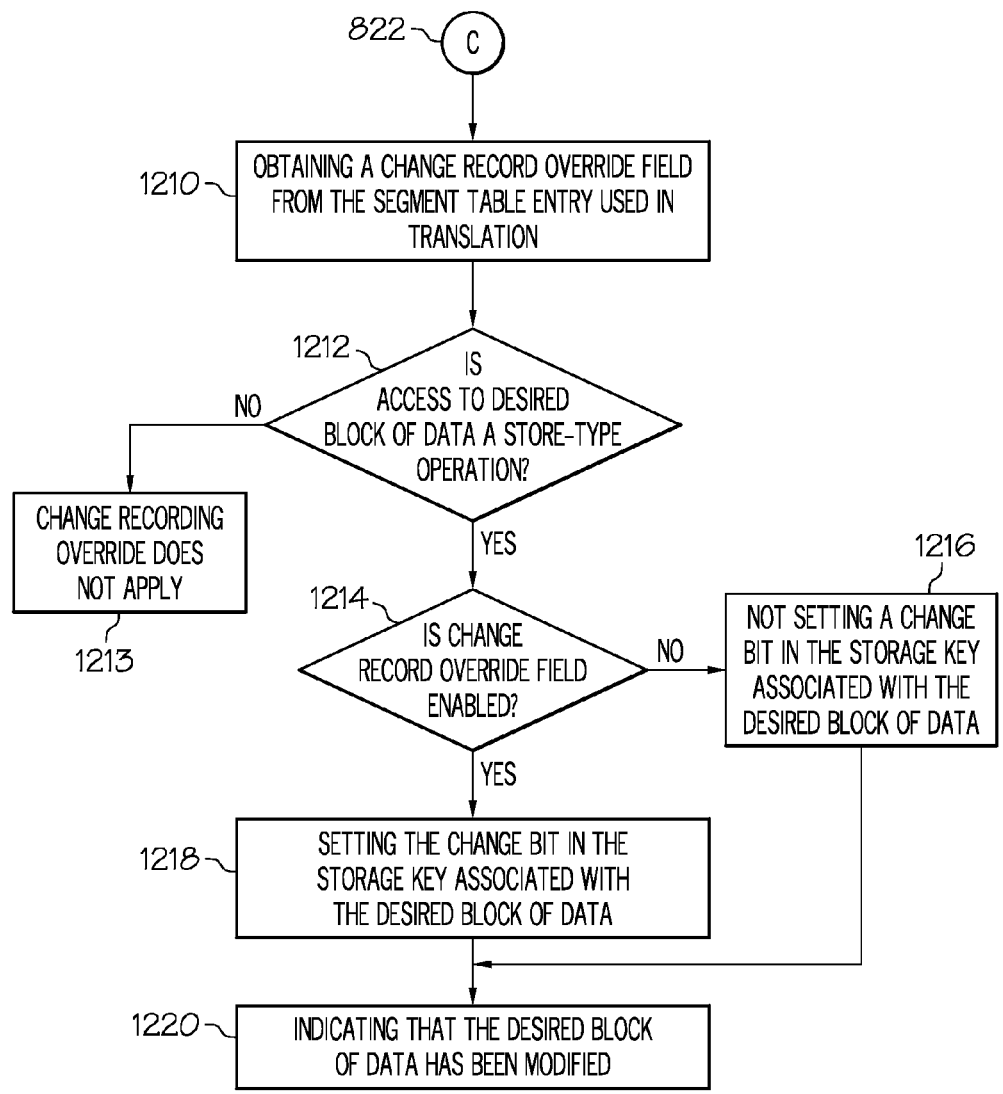
FIG. 12 illustrates a continuation of the flow diagram from node 822 of FIG. 8 wherein a change recording override field is obtained from a segment table entry.

Reference is now being made to FIG. 12 illustrating a flow diagram of one embodiment of obtaining the change recording override field from the segment table entry used in dynamic address translation of a virtual address.

Dynamic address translation proceeds to the point wherein a segment table entry has been fetched from a segment table used in translation as described in FIG. 6 to node 616. Address translation continues as described in FIG. 8 to node 822 wherein an absolute address to a desired block of data in storage or memory has been obtained. The flow of FIG. 12 begins at node 822.

At 1210, a change recording override (CO) field is obtained from the segment table entry used in translation. Change recording override enables the storage key's change bit to be overridden. At 1212, a determination is made whether access performed on the desired block of data addressed by the translated virtual address is a store-type or a fetch-type operation. If the access is a fetch-type access then, at 1213, the setting of the change bit does not occur and change recording override does not apply. If the access was a store-type operation then, at 1214, a determination is made as to whether the change recording override in the segment table entry is enabled. If, at 1214, change recording override is not enabled then, at 1218, the change bit of the storage key associated with the desired block is set to 1. If, at 1214, change recording override is enabled then, at 1216, the change bit of the associated storage key is not set. At 1220, an indication is made that the desired block of data has been modified.

In another embodiment, if enhanced DAT applies and the format control in the STE is not enabled, an origin of a page table is obtained from the segment table entry. A page index portion of the virtual address is used to reference a page table entry in the page table. A page-frame real address of a small block of data in main storage and a page change override field are obtained from the page table entry. Each small block of data has an associated storage key containing a change bit. The small block of data is smaller in size than the large block of data and consists of a 4 Kilobyte (4096 bytes) block of data. A translated address of a desired real block of data in main storage contains a combination of the page-frame real address and the byte-index portion of the virtual. A determination is made whether a store or a fetch-type operation was performed to the desired real block of data. If the access operation was a fetch-type operation then change recording override does not apply. If the access was a store-type operation, then if the change recording override field associated with the virtual address is disabled then the change bit of the storage key associated with the desired 4K block is set to 1. An indication is provided that the desired 4K block has been modified.

In another embodiment, if the change recording override field is enabled, the change bit of the storage key associated with the desired 4K block is unpredictable.

Commercial Implementation

Although the z/Architecture by IBM® is mentioned herein, one or more aspects of the present invention are equally applicable to other machine architectures and/or computing environments employing pageable entities or similar constructs.

Commercial implementations of the eDAT facility and other formats, instructions, and attributes disclosed herein can be implemented either in hardware or by programmers, such as operating system programmers, writing in, for example, assembly language. Such programming instructions may be stored on a storage medium intended to be executed natively in a computing environment such as the IBM® System z server, or alternatively in machines executing other architectures. The instructions can be emulated in existing and in future IBM® servers and on other machines or mainframes. They can be executed in machines where generally execution is in an emulation mode.

One or more aspects of the present invention are equally applicable to, for instance, virtual machine emulation, in which one or more pageable entities (e.g., guests) execute on one or more processors. As one example, pageable guests are defined by the Start Interpretive Execution (SIE) architecture described in "IBM® System/370 Extended Architecture", IBM® Pub. No. SA22-7095 (1985), which is incorporated herein by reference in its entirety.

In emulation mode, the specific instruction being emulated is decoded, and a subroutine is executed to implement the individual instruction, as in a subroutine or driver, or some other technique is used for providing a driver for the specific hardware, as is within the skill of those in the art after understanding the description hereof. Various software and hardware emulation techniques are described in numerous United States patents including: U.S. Pat. Nos. 5,551,013, 5,574,873, 5,790,825, 6,009,261, 6,308,255, and 6,463,582, each of which is incorporated herein by reference. Many other teachings further illustrate a variety of ways to achieve emulation of an instruction set architected for a target machine.

Other Variations and Architectures

The various embodiments described herein are just examples. There may be many variations to these embodiments without departing from the spirit of the present invention.

One or more of the capabilities of the present invention can be implemented in software, firmware, hardware, or some combination thereof. Aspects of the invention are beneficial to many types of environments, including other environments that have a plurality of zones, and non-partitioned environments. Further, there may be no central processor complexes, but yet, multiple processors coupled together. Various aspects hereof are applicable to single processor environments.

Although particular environments are described herein, again, many variations to these environments can be implemented without departing from the spirit of the present invention. For example, if the environment is logically partitioned, then more or fewer logical partitions may be included in the environment. Further, there may be multiple central processing complexes coupled together. These are only some of the variations that can be made without departing from the spirit of the present invention. Additionally, other variations are possible.

Although the term 'page' is used to refer to a fixed size or a predefined size area of storage, the size of a page can vary. Similarly, the size of a block can vary. There may be different sizes of blocks and/or pages. A page may be equivalent to a block. Other structures may be alternatively used or otherwise implemented through software and/or hardware. Further, in the examples described herein, there may be many variations, including, but not limited to different sized words or addresses; a different number of bits; bits in a different order; more, fewer or different bits; more, fewer or different fields; fields in a differing order; different sizes of fields; etc. Again, these are only provided as an example. Many variations are possible.

A processing unit includes pageable entities, such as guests, hosts, other processors, emulators, virtual machines, and/or other similar constructs. A buffer includes an area of storage and/or memory as well as different types of data structures including, but not limited to, arrays or pageable entities. A table can include other data structures as well. An instruction can reference other registers. Moreover, a page, a segment, and/or a region can be of varying sizes different than those described herein.

One or more aspects of the present invention can be included in an article of manufacture (e.g., one or more computer program products) having, for instance, computer usable or machine readable media. The media has embodied therein, for instance, computer readable program code means or logic (e.g., instructions, code, commands, etc.) to provide and facilitate the capabilities of the present invention. The article of manufacture can be included as a part of a computer system or sold separately. Additionally, at least one program storage device readable by a machine embodying at least one program of instructions executable by the machine to perform the capabilities of the present invention can be provided.

The flow diagrams depicted herein are illustrative. There may be many variations to these diagrams or the steps or operations described without departing from the spirit of the invention. For instance, the steps may be performed in a differing order, or steps may be added, deleted or modified. All of these variations are considered a part of the invention as claimed.

Although embodiments hereof have been depicted and described in detail herein, it will be apparent to those skilled in the relevant art that various modifications, additions, substitutions and the like can be made without departing

What we claim is:

1. A computer program product for protecting data in a computer system of a machine architecture, the computer program product comprising:
a non-transitory computer storage medium readable by said computer system, said computer storage medium storing instructions for performing:
building a software routine to emulate execution of an instruction of a first computer architecture on a general purpose processor of an alternate computer architecture, said instruction configured to protect data, said software routine comprising a plurality of instructions, said software routine configured to cause said general purpose processor of said alternate computer architecture to perform
obtaining for translation a virtual address of a desired block of main storage;
obtaining an initial origin address of a translation table in a hierarchy of translation tables, said hierarchy of translation tables comprising a segment table;
based on said obtained initial origin address and said virtual address, obtaining a segment table entry from said segment table, said segment table entry configured to contain a format control field;
in response to an enhanced dynamic address translation (eDAT) facility being enabled, determining whether said format control field in said segment table entry is enabled; and
in response to said format control field being enabled when key controlled protection applies, performing:
determining whether an access validity field in said segment table entry is enabled, said segment table entry comprising said access validity field, a segment access control field, a segment fetch protection field and a segment-frame absolute address of a large block of main storage, said large block of main storage comprising said desired block of main storage; and
in response to said access validity field being enabled, performing,
not permitting fetches from said desired block of main storage in response to the segment fetch protection field being enabled and a program access key being not equal to said segment access control field, the program access key provided by any one of a Program Status Word or an operand of a program instruction, wherein the fetches are associated with the virtual address;
permitting fetches from said desired block of main storage in response to the segment fetch protection field being enabled and said program access key being equal to said segment access control field, the program access key provided by any one of a Program Status Word or the operand of the program instruction; and
permitting fetches from said desired block of main storage in response to the segment fetch protection field not being enabled.

2. The computer program product according to claim 1, wherein said translated address is any one of a real address or absolute address, wherein the real address is subject to prefixing to form the absolute address, wherein said hierarchy of translation tables comprises one or more of a region first table, a region second table, a region third table and said segment table, wherein obtaining said segment table entry from said segment table comprises any one of A, B, C, D:
A) based on said obtained initial origin address of said region first table, using a first index portion of said virtual address to reference a region first table entry in said region first table containing an origin address of said region second table; based on said origin address of said region second table, using a second index portion of said virtual address to reference a region second table entry in said region second table containing an origin address of said region third table; based on said origin address of said region third table, using a third index portion of said virtual address to reference a region third table entry in said region third table containing an origin address of said segment table; and based on said origin address of said segment table, using a segment index portion of said virtual address to reference a segment table entry in said segment table;
B) based on said obtained initial origin address of said region second table, using the second index portion of said virtual address to reference said region second table entry in said region second table containing an origin address of said region third table; based on said origin address of said region third table, using said third index portion of said virtual address to reference said region third table entry in said region third table containing the origin address of said segment table; and based on said origin address of said segment table, using said segment index portion of said virtual address to reference said segment table entry in said segment table;
C) based on said obtained initial origin address of said region third table, using said third index portion of said virtual address to reference said region third table entry in said region third table containing the origin address of said segment table; and based on said origin address of said segment table, using said segment index portion of said virtual address to reference said segment table entry in said segment table; and
D) based on the obtained initial origin address of said segment table, using said segment index portion of said virtual address to reference said segment table entry.

3. The computer program product according to claim 2, wherein said hierarchy of translation tables further comprises a page table, and wherein in response to said eDAT facility being enabled and said format control field being not enabled, performing:
obtaining from said segment table entry an origin address of said page table and using a page index portion of said virtual address to reference a page table entry in said page table;
obtaining from a page table entry, a page-frame real address of a small block of main storage, said small block of main storage being smaller in size than said large block of main storage and consisting of a 4 Kilobyte block of main storage, said small block of main storage associated with a storage key comprising a storage access control field and a storage fetch protection field, wherein a translated address of a desired real block of main storage in main storage comprises a combination of said page-frame real address and a byte-index portion of said virtual address;
permitting stores to said desired real block of main storage, wherein the stores are associated with the virtual address, only in response to said program access key matching said storage access control field, said program access key being provided by a program entity comprising any one of a Program Status Word or an operand of a program instruction being executed; and permitting fetches from said desired block of main storage wherein the fetches are associated with the virtual address only in response to either a) the storage fetch protection field being disabled, or b) in response to both the storage fetch protection field being enabled and a program access key associated with the virtual address being equal to said storage access control field, said program access key being provided by any one of a Program Status Word or an operand of a program instruction being executed.

4. The computer program product according to claim 2, wherein said hierarchy of translation tables further comprises a page table and wherein in response to said eDAT facility being not enabled, performing:

obtaining from a page table entry, a page-frame real address of a small block of main storage, said small block of main storage being smaller in size than said large block of main storage and consisting of a 4 Kilobyte block of main storage associated with a storage key, the storage key comprising an access control field and a storage fetch protection field, wherein a translated address of a desired real block of main storage in main storage comprises a combination of said page-frame real address and a byte-index portion of said virtual address;

permitting stores to said desired real block of main storage wherein the stores are associated with the virtual address only in response to said program access key matching said storage access control field; and permitting fetches from said desired block of main storage wherein the fetches are associated with the virtual address only in response to either a) the storage fetch protection field being disabled, or b) in response to both the storage fetch protection field being enabled and a program access key associated with the virtual address being equal to said storage access control field, said program access key being provided by any one of a Program Status Word or an operand of a program instruction being executed.

5. The computer program product according to claim 1, wherein in response to said access validity field and said fetch protection field being enabled, indicating a protection exception in response to a fetch operation being attempted from said desired block of main storage and said segment access control field not matching said program access key, said fetch operation being associated with said virtual address.

6. The computer program product according to claim 1, wherein in response to said access validity field being enabled, indicating a protection exception in response to a fetch operation or a store operation being attempted at said desired block of main storage and said segment access control field not matching a program access control field, said fetch or store operations being associated with said virtual address.

7. The computer program product according to claim 1, wherein determining whether said access validity field is enabled further comprises determining any one of a) whether a Storage-Protection-Override field of a control register is disabled or b) whether said Storage-Protection-Override field is enabled and said segment access control field is not enabled.

8. The computer program product according to claim 1, further comprising:

storing information used in said virtual address to be translated of said virtual address in at least one translation lookaside buffer; and performing a subsequent translation of a subsequent virtual address into said absolute address of said block of data in main storage using said stored information from said translation lookaside buffer rather than said hierarchy of translation tables.

9. The computer program product according to claim 1, wherein responsive to said virtual address to be translated being not native to a machine architecture, further comprising:

identifying a predetermined software routine for emulating said translation, said predetermined software routine comprising a plurality of instructions; and executing said predetermined software routine.

10. A system for protecting data in a computer system of a machine architecture, the system comprising:

a computer main storage capable of storing machine instructions and a hierarchy of translation tables used for dynamic address translation of a virtual address into a real address or absolute address of a desired block of main storage, said real address being subject to a prefixing operation; and a processor in communications with said computer main storage, said processor comprising an instruction fetching element for fetching instructions from memory of a first computer architecture and executed by said processor of an alternate computer architecture and one or more execution elements for interpreting said fetched instructions to identify a predetermined software subroutine for emulating an operation of said fetched instructions, said predetermined software subroutine comprising a plurality of instructions capable of accessing said hierarchy of translation tables stored in said main storage, said processor performing a method comprising obtaining for translation a virtual address of a desired block of main storage;

obtaining an initial origin of a translation table in a hierarchy of translation tables, said hierarchy of translation tables comprising a segment table;

based on said obtained initial origin address and said virtual address, obtaining a segment table entry from said segment table, said segment table entry configured to contain a format control field;

in response to an enhanced dynamic address translation (eDAT) facility being enabled, determining whether said format control field in said segment table entry is enabled; and in response to said format control field being enabled when key controlled protection applies, performing:

determining whether an access validity field in said segment table entry is enabled, said segment table entry comprising said access validity field, a segment access control field, a segment fetch protection field and a segment-frame absolute address of a large block of main storage, said large block of main storage comprising said desired block of main storage; and in response to said access validity field being enabled, performing, not permitting fetches from said desired block of main storage in response to the segment fetch protection field being enabled and a program access key being not equal to said segment access control field, the program access key provided by any one of a Program Status Word or an operand of a program instruction, wherein the fetches are associated with the virtual address;

permitting fetches from said desired block of main storage in response to the segment fetch protection field being enabled and said program access key being equal to said segment access control field, the program access key provided by any one of a Program Status Word or the operand of the program instruction; and permitting fetches from said desired block of main storage in response to the segment fetch protection field not being enabled.

11. The system according to claim 10, wherein said translated address is any one of a real address or absolute address, wherein the real address is subject to prefixing to form the absolute address, wherein said hierarchy of translation tables comprises one or more of a region first table, a region second table, a region third table and said segment table, wherein obtaining said segment table entry from said segment table comprises any one of A, B, C, D:

A) based on said obtained initial origin address of said region first table, using a first index portion of said virtual address to reference a region first table entry in said region first table containing an origin address of said region second table; based on said origin address of said region second table, using a second index portion of said virtual address to reference a region second table entry in said region second table containing an origin address of said region third table; based on said origin address of said region third table, using a third index portion of said virtual address to reference a region third table entry in said region third table containing an origin address of said segment table; and based on said origin address of said segment table, using a segment index portion of said virtual address to reference a segment table entry in said segment table;

B) based on said obtained initial origin address of said region second table, using the second index portion of said virtual address to reference said region second table entry in said region second table containing an origin address of said region third table; based on said origin address of said region third table, using said third index portion of said virtual address to reference said region third table entry in said region third table containing the origin address of said segment table; and based on said origin address of said segment table, using said segment index portion of said virtual address to reference said segment table entry in said segment table;

C) based on said obtained initial origin address of said region third table, using said third index portion of said virtual address to reference said region third table entry in said region third table containing the origin address of said segment table; and based on said origin address of said segment table, using said segment index portion of said virtual address to reference said segment table entry in said segment table; and D) based on the obtained initial origin address of said segment table, using said segment index portion of said virtual address to reference said segment table entry.

12. The system according to claim 11, wherein said hierarchy of translation tables further comprises a page table, and wherein in response to said eDAT facility being enabled and said format control field being not enabled, performing:

obtaining from said segment table entry an origin of a page table and using a page index portion of said virtual address to reference a page table entry in said page table;

obtaining from said page table entry, a page-frame real address of a small block of main storage, said small block of main storage being smaller in size than said large block of main storage and comprising a 4 Kilobyte block of main storage, said small block of main storage associated with a storage key comprising a storage access control field and a storage fetch protection field, wherein a translated address of a desired real block of main storage comprises a combination of said page-frame real address and a byte-index portion of said virtual address;

permitting stores to said desired real block of main storage, wherein the stores are associated with the virtual address, only in response to said program access key matching said storage access control field, said program access key being provided by a program entity comprising any one of a Program Status Word or an operand of a program instruction being executed; and permitting fetches from said desired block of main storage wherein the fetches are associated with the virtual address only in response to either a) the storage fetch protection field being disabled, or b) in response to both the storage fetch protection field being enabled and a program access key associated with the virtual address being equal to said storage access control field, said program access key being provided by any one of a Program Status Word or an operand of a program instruction being executed.

13. The system according to claim 10, wherein in response to said program access key being zero, permitting stores to said desired block of main storage and fetches from said desired block of main storage, wherein the stores and fetches are associated with the virtual address.

14. The system according to claim 10, wherein in response to said access validity field being enabled, indicating a protection exception in response to a fetch operation or a store operation being attempted at said desired block of main storage and said segment access control field not matching said program access key, said fetch or store operations being associated with said virtual address.

15. The system according to claim 10, wherein determining whether said access validity field is enabled further comprises determining any one of a) whether a Storage-Protection-Override field of a control register is disabled or b) whether said Storage-Protection-Override field is enabled and said segment access control field is not enabled.

16. A method for protecting data in a computer system having a hierarchy of translation tables used for translation of a virtual address into a translated address of a block of main storage, the method comprising:

building a software routine to emulate execution of an instruction of a first computer architecture on a general purpose processor of an alternate computer architecture, said instruction configured to protect data, said software routine comprising a plurality of instructions, said software routine configured to cause said general purpose processor of said alternate computer architecture to perform obtaining for translation a virtual address of a desired block of main storage;

obtaining an initial origin of a translation table in a hierarchy of translation tables, said hierarchy of translation tables comprising a segment table;

based on said obtained initial origin address and said virtual address, obtaining a segment table entry from said segment table, said segment table entry configured to contain a format control field;

in response to an enhanced dynamic address translation (eDAT) facility being enabled, determining whether said format control field in said segment table entry is enabled; and in response to said format control field being enabled, performing:
 determining whether an access validity field in said segment table entry is enabled, said segment table entry comprising said access validity field, a segment access control field, a segment fetch protection field and a segment-frame absolute address of a large block of main storage, said large block of main storage comprising said desired block of main storage; and
 in response to said access validity field being enabled when key controlled protection applies, performing:
  not permitting fetches from said desired block of main storage in response to the segment fetch protection field being enabled and a program access key being not equal to said segment access control field, the program access key provided by any one of a Program Status Word or an operand of a program instruction, wherein the fetches are associated with the virtual address;
  permitting fetches from said desired block of main storage in response to the segment fetch protection field being enabled and said program access key being equal to said segment access control field, the program access key provided by any one of a Program Status Word or the operand of the program instruction; and
  permitting fetches from said desired block of main storage in response to the segment fetch protection field not being enabled.

17. The method according to claim 16, wherein said translated address is any one of a real address or absolute address, wherein the real address is subject to prefixing to form the absolute address, wherein said hierarchy of translation tables comprises one or more of a region first table, a region second table, a region third table and said segment table, wherein obtaining said segment table entry from said segment table comprises any one of A, B, C, D:

A) based on said obtained initial origin address of said region first table, using a first index portion of said virtual address to reference a region first table entry in said region first table containing an origin address of said region second table; based on said origin address of said region second table, using a second index portion of said virtual address to reference a region second table entry in said region second table containing an origin address of said region third table; based on said origin address of said region third table, using a third index portion of said virtual address to reference a region third table entry in said region third table containing an origin address of said segment table; and based on said origin address of said segment table, using a segment index portion of said virtual address to reference a segment table entry in said segment table;

B) based on said obtained initial origin address of said region second table, using the second index portion of said virtual address to reference said region second table entry in said region second table containing an origin address of said region third table; based on said origin address of said region third table, using said third index portion of said virtual address to reference said region third table entry in said region third table containing the origin address of said segment table; and based on said origin address of said segment table, using said segment index portion of said virtual address to reference said segment table entry in said segment table;

C) based on said obtained initial origin address of said region third table, using said third index portion of said virtual address to reference said region third table entry in said region third table containing the origin address of said segment table; and based on said origin address of said segment table, using said segment index portion of said virtual address to reference said segment table entry in said segment table; and D) based on the obtained initial origin address of said segment table, using said segment index portion of said virtual address to reference said segment table entry.

18. The method according to claim 17, wherein said hierarchy of translation tables further comprises a page table, and wherein in response to said eDAT facility being enabled and said format control field being not enabled, performing:

obtaining from said segment table entry an origin of a page table and using a page index portion of said virtual address to reference a page table entry in said page table;

obtaining from said page table entry, a page-frame real address of a small block of main storage, said small block of main storage being smaller in size than said large block of data main storage and comprising a 4 Kilobyte block of memory, said small block of main storage associated with a storage key comprising an storage access control field and a storage fetch protection field, wherein a translated address of a desired real block of main storage comprises a combination of said page-frame real address and a byte-index portion of said virtual address;

permitting stores to said desired real block of main storage, wherein the stores are associated with the virtual address, only in response to said program access key matching said storage access control field, said program access key being provided by a program entity comprising any one of a Program Status Word or an operand of a program instruction being executed; and permitting fetches from said desired block of main storage wherein the fetches are associated with the virtual address only in response to either a) the storage fetch protection field being disabled, or b) in response to both the storage fetch protection field being enabled and a program access key associated with the virtual address being equal to said storage access control field, said program access key being provided by any one of a Program Status Word or an operand of a program instruction being executed.

19. The method according to claim 17, wherein said hierarchy of translation tables further comprises a page table, and wherein in response to said eDAT facility being not enabled, performing:

obtaining from said segment table entry an origin address of a page table and using a page index portion of said virtual address to reference a page table entry in said page table;

obtaining from said page table entry, a page-frame real address of a small block of main storage, said small block of main storage being smaller in size than said large block of main storage and comprising a 4 Kilobyte block of main storage associated with a storage key, the storage key comprising an storage access control field and a storage fetch protection field, wherein a translated address of a desired real block of main storage comprises a combination of said page-frame real address and a byte-index portion of said virtual address;

permitting stores to said desired real block of main storage wherein the stores are associated with the virtual address only in response to said access key matching said storage access control field; and permitting fetches from said desired block of main storage wherein the fetches are associated with the virtual address only in response to either a) the storage fetch protection field being disabled, or b) in response to both the storage fetch protection field being enabled and a program access key associated with the virtual address being equal to said storage access control field, said program access key being provided by any one of a Program Status Word or an operand of a program instruction being executed.

20. The method according to claim 16, wherein in response to said program access key being zero, permitting stores to said desired block of main storage and fetches from said desired block of main storage, wherein the stores and fetches are associated with the virtual address.

* * * * *